United States Patent [19]

Anderson et al.

[11] Patent Number: 4,994,173

[45] Date of Patent: Feb. 19, 1991

[54] METHOD OF ADDING ZSM-5 CONTAINING CATALYST TO FLUID BED CATALYTIC CRACKING UNITS

[75] Inventors: Conroy D. Anderson, Wenonah; Tai-Sheng Chou; Sewell, N.J.; Frederick J. Krambeck, Cherry Hill, N.J.; Paul H. Schipper, Wilmington, Del.

[73] Assignee: Mobil Oil Corporation, Fairfax, Va.

[21] Appl. No.: 470,025

[22] Filed: Jan. 25, 1990

Related U.S. Application Data

[60] Division of Ser. No. 187,099, Jun. 28, 1988, Pat. No. 4,927,526, which is a continuation-in-part of Ser. No. 627,991, Jul. 7, 1984, abandoned, and a continuation-in-part of Ser. No. 628,062, Jul. 8, 1984, abandoned, and a continuation-in-part of Ser. No. 675,375, Nov. 27, 1984, abandoned, and a continuation-in-part of Ser. No. 629,922, Jul. 11, 1984, abandoned.

[51] Int. Cl.$^5$ .............................................. C10G 11/18
[52] U.S. Cl. .................................... 208/152; 208/153; 208/120; 208/113; 208/164
[58] Field of Search ............... 208/152, 120, 153, 113, 208/164

[56] References Cited

U.S. PATENT DOCUMENTS

| | | | |
|---|---|---|---|
| 3,758,403 | 9/1973 | Rosinski | 208/120 |
| 4,309,279 | 1/1982 | Chester et al. | 208/120 |
| 4,889,616 | 12/1989 | Miller et al. | 208/120 |
| 4,927,523 | 5/1990 | Donnelly | 208/152 |
| 4,927,526 | 5/1990 | Anderson et al. | 208/152 |
| 4,929,337 | 5/1990 | Herbst et al. | 208/120 |

FOREIGN PATENT DOCUMENTS 0044631 6/1981 European Pat. Off. .
0163979 6/1985 European Pat. Off. .

Primary Examiner—Anthony McFarlane
Assistant Examiner—Nhat Phan
Attorney, Agent, or Firm—Alexander J. McKillop; Charles J. Speciale; Richard D. Stone

[57] ABSTRACT

Modified ZSM-5 type zeolite catalyst is prepared by controlled aging in a moving bed catalytic cracking unit. The modified catalyst exhibits significant olefin isomerization activity and reduced paraffin cracking activity. Hydrocarbons are cracked to products boiling in the motor fuel range, e.g., gasoline, by using the modified catalyst mixture comprising a ZSM-5 type zeolite and a conventional cracking catalyst. The ZSM-5 type zeolite is treated with partial pressure steam under conditions which increase the gasoline octane number of the product fuel without decreasing gasoline plus distillate yield. A process for changing a catalytic cracking unit's inventory from a conventional catalyst to a modified ZSM-5 type containing catalyst is also disclosed.

4 Claims, 2 Drawing Sheets

EFFECT OF ZSM-5 ADDITIVE IN FCC CATALYST

EFFECT OF ZSM-5 ADDITIVE IN FCC CATALYST

EFFECT OF ZSM-5 ADDITIVE IN FCC CATALYST

EFFECT OF ZSM-5 ADDITIVE ON FCC CATALYST

METHOD OF ADDING ZSM-5 CONTAINING CATALYST TO FLUID BED CATALYTIC CRACKING UNITS

CROSS-REFERENCE TO RELATED APPLICATIONS

This is a division of copending application Ser. No. 187,099, filed on June 28, 1988, now U.S. Pat. No. 4,927,526, which is a continuation-in-part of U.S. patent applications Ser. No. 627,991 filed July 7, 1984, now abandoned, Ser. No. 628,062 filed July 8, 1984, now abandoned, Ser. No. 675,375 filed Nov. 27, 1984, now abandoned, and Ser. No. 629,922, filed July 11, 1984, now abandoned, each of which is relied upon and incorporated by reference herein.

BACKGROUND OF THE INVENTION

1. Field of the Invention

This invention relates to an improved process for increasing gasoline octane number in catalytic cracking units without decreasing total liquid yield. This invention particularly relates to increasing gasoline octane without a significant loss in $C_6^+$ fraction, i.e., gasoline plus distillate, yield with the use of ZSM-5 type catalysts, which have been selectivated (as defined hereinafter) by exposure to high temperature partial pressure steam, in admixture with cracking catalysts.

2. Description of the Prior Art

Hydrocarbon conversion processes utilizing crystalline zeolites have been the subject of extensive investigation during recent years, as is obvious from both the patent and scientific literature. Crystalline zeolites have been found to be particularly effective for a wide variety of hydrocarbon conversion processes, including the catalytic cracking of a gas oil to produce motor fuels, and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking, and such disclosure appears in one or more of the above-identified U.S. patents.

It is also known that improved results will be obtained with regard to the catalytic cracking of gas oils if a crystalline zeolite having a pore size of less than 7 angstrom units is admixed with a crystalline zeolite having a pore size greater than 8 angstrom units, either with or without a matrix. A disclosure of this type is found in U.S. Pat. No. 3,769,202. Although the incorporation of a crystalline zeolite having a pore size of less than 7 angstrom units into a catalyst comprising a larger pore size crystalline zeolite (pore size greater than 8 angstrom units) has indeed been very effective with respect to the raising of octane number, nevertheless it did so at the expense of the yield of gasoline.

Improved octane number with some loss in gasoline yield was shown in U.S. Pat. No. 3,758,403, the entire contents of which are incorporated herein by reference. In this patent, the cracking catalyst was comprised of a large pore size crystalline zeolite (pore size greater than 7 angstrom units) in admixture with ZSM-5 type zeolite, wherein the ratio of ZSM-5 type zeolite to large pore size crystalline zeolite was in the range of 1:10 to 3:1.

The use of ZSM-5 type zeolite in conjunction with a zeolite cracking catalyst of the X or Y faujasite variety is described in U.S. Pat. Nos. 3,894,931; 3,894,933; and 3,894,934. The first two patents disclose the use of ZSM-5 type zeolite in amounts up to about 5 to 10 wt %; the third patent discloses the weight ratio of ZSM-5 type zeolite to large pore size crystalline zeolite in the range of 1:10 to 3:1.

The ZSM-5 type catalyst, especially virgin catalyst, has exceedingly high activity. Researchers have attempted to take advantage of the activity of fresh ZSM-5 catalyst by adding only small amounts of it to FCC catalyst. Typical of such work is U.S. Pat. No. 4,309,280, the entire contents of which is incorporated herein by reference. This patent teaches the addition of very small amounts of powdered ZSM-5 catalyst, characterized by a particle size less than 5 microns. This patent teaches that adding as little as 0.25 wt % ZSM-5 powder to the circulating catalyst inventory in an FCC unit would increase dry gas production by 50% (from 3.9 wt % dry gas to 6.0 wt %; see Example 6 in Table 2).

The criticality of using only minuscule amounts of a ZSM-5 type zeolite to achieve improved results with respect to octane number and overall yield has been shown in U.S. Pat. No. 4,368,114. In this patent, the use of only minuscule quantities of additive catalyst was shown to give the same beneficial results that were once thought obtainable only by adding much larger quantities of ZSM-5 type catalyst.

In order to reduce automobile exhaust emissions to meet federal and state pollution requirements, many automobile manufactures have equipped the exhaust systems of their vehicles with catalytic converters. These converters contain catalysts which are poisoned by tetraethyl lead. Since tetraethyl lead has been widely used to boost the octane number of gasoline, refiners now have to turn to alternate means to improve gasoline octane number.

The removal of lead from the gasoline pool and the resultant demand for unleaded gasoline has increased the value of octane. Further, as the distillate demand grows, both in the United States and Europe, refiners will tend to operate their catalytic crackers in modes which promote the formation of distillates as compared to gasoline. However, the operational conditions tend to decrease gasoline octane. Therefore, an increasing demand for high octane gasoline has resulted. While the prior art has shown that zeolites, and in particular ZSM-5, can increase gasoline octane in cracking units, its use will be restricted if a significant gasoline yield penalty and high gas make accompany the octane gain. In this situation, only refiners who have available gas handling and lower hydrocarbon upgrading capacities will find zeolites, such as ZSM-5, attractive in their cracking operations.

One method of increasing octane number is to raise the cracker reactor temperature. This method, however, is very limited, since many units are now operating at maximum temperatures due to metallurgical limitations. Raising the cracker reactor temperature also results in increased requirements for the gas plant (i.e., gas compressor and separator). Since most gas plants are now operating at maximum capacity, any increased load could not be tolerated by the present equipment.

As can well be appreciated from the foregoing, it would be extremely desirable to have a process which will provide high octane unleaded gasoline without undue sacrifice of gasoline plus distillate yield. It would be even more desirable if such results could be obtained in conjunction with an increase in operational flexibility and without undue use of expensive catalysts.

It is thus an object of the present invention to provide a process for increasing gasoline octane number without significant loss of gasoline plus distillate yield in a catalytic cracking unit.

Further, it is an object of the present invention to overcome the deficiencies of the prior art.

These and other objects are fulfilled by the present invention, which is disclosed below.

SUMMARY OF THE INVENTION

The present invention provides a process for catalytically cracking a hydrocarbon feedstock in a cracking unit to a product comprising gasoline with an increased octane number in the presence of a cracking catalyst under cracking conditions. The cracking catalyst comprises a catalytically active cracking component admixed with a zeolite having a Constraint Index between 1 and 12 and a silica-to-alumina ratio greater than 10. The improvement resides in treating the zeolite with partial pressure steam and a temperature in the range between 400° and 1600° F. (205° and 870° C.) for a time sufficient to increase the octane number of the gasoline without substantially decreasing the gasoline plus distillate yield.

The present invention is also directed to a process for catalytically cracking hydrocarbons under catalytic cracking conditions, comprising contacting the hydrocarbons with a catalyst comprising (a) a crystalline silicate zeolite having a pore size of at least 8 Angstrom units, and (b) a crystalline silicate zeolite having an X-ray diffraction pattern as shown on page 14 of this application. The range of the amount of (b), based on the combined weight of (a) and (b), is between about 0.01 and 10 wt %. The initial activity of the catalyst can be changed by exposing (b) to a gaseous mixture which includes steam at a pressure between 0 and 45 psig and a temperature between 400° and 1600° F. A substantially identical change in the initial activity can be effected when the catalyst is either contacted with the hydrocarbons under cracking conditions or the catalyst is subjected to regeneration conditions. The process is continued until the amount of (b) in the catalyst decreases. Thereafter, a product of gasoline and distillate which exhibits a ratio of octane number of $C_6^+$ yield, which is greater than that realized by contacting the hydrocarbon with (a) alone and is at least equal to that realized by contacting the hydrocarbons with the catalyst exhibiting the initial activity, is recovered.

The present invention is also directed to a crystalline material having the crystal structure of ZSM-5 which, when in contact with long-chain relatively low octane olefins, at hydrocarbon conversion conditions sufficient to convert at least a portion of the olefins, exhibits as a primary conversion mechanism the isomerization of the long-chain olefins to higher octane number materials.

The present invention is further directed to a process for increasing gasoline octane number in the catalytic cracking of a hydrocarbon feedstock without decreasing gasoline plus distillate yield in the presence of a cracking catalyst comprising a catalytically active cracking component and a second component, the second component comprising a zeolite having a Constraint Index between 1 and 12 and a silica-to-alumina ratio greater than 10, under cracking conditions, the improvement wherein the zeolite, alone or in admixture with the cracking catalyst, is treated with partial pressure steam at a temperature between about 1350° and 1450° F. (732°–788° C.) and at a pressure of between about 0 and 45 psig for no less than about 10 hours, such that the octane number of the gasoline produced as the result of cracking feedstock is increased with no decrease in gasoline plus distillate yield.

The present invention is also directed to a process of adding ZSM-5 type containing catalyst into a moving bed catalytic cracking unit containing a circulating catalyst inventory of conventional cracking catalyst to produce an equilibrium catalyst containing a desired ZSM-5 content comprising:

(a) removing on a daily average basis from 0.25 to 20% of the circulating catalyst inventory;

(b) replacing the removed catalyst with changeover catalyst containing 1.5 to 10 times the ZSM-5 content of the equilibrium catalyst; and (c) repeating the steps of catalyst removal and replacement while replacing no more than 50% of the catalyst inventory in a one-week period, whereby the ZSM-5 content of the circulating catalyst is smoothly and gradually brought up to the desired ZSM-5 content to produce equilibrium catalyst with the desired ZSM-5 content over a period of at least one week.

Further, the present invention is directed to a process for converting a conventional moving bed catalytic cracking unit, having a circulating catalyst inventory, from a catalyst inventory comprising a conventional large pore zeolite containing catalyst to a catalyst inventory comprising equilibrium catalyst of large pore zeolite with an equilibrium ZSM-5 content of 1 to 7 wt %, comprising:

(a) removing on a daily average basis 0.5 to 10% of the circulating catalyst inventory;

(b) replacing the removed catalyst with changeover catalyst containing from 1.5 to 10 times the equilibrium ZSM-5 content; and (c) repeating steps (a) and (b), over a period of at least one week, until the desired equilibrium ZSM-5 content of the circulating catalyst inventory is 1 to 7 wt %.

Further still, the present invention is directed to a process for replacing the conventional circulating catalyst inventory, comprising a specified amount of a rare earth-exchanged zeolite Y (REY) in a conventional amorphous binder of a moving bed thermal catalytic cracking unit, with equilibrium catalyst containing 1 to 7 wt % ZSM-5, comprising:

(a) on a daily basis removing 0.25 to 2 wt % of the circulating catalyst inventory;

(b) replacing the removed catalyst with ZSM-5 rich catalyst containing 5 to 15 wt % ZSM-5 and reduced REY content; and (c) continuing the daily removal and replacement of conventional catalyst with ZSM-5 rich catalyst until at least 50% of the circulating catalyst has been removed and replaced with ZSM-5 rich catalyst to produce the equilibrium catalyst containing 1 to 7 wt % ZSM-5.

Further still, the present invention is directed to a process of adding a ZSM-5 additive catalyst to the catalyst inventory of a fluidized catalytic cracking unit comprising (a) determining a target octane number boost desired, said octane boost being at least 0.5 research octane number, in the gasoline fraction of the FCC product stream;

(b) making a first addition of the ZSM-5 additive catalyst within a period of no more than about 24 hours sufficient to produce the desired target octane boost; and (c) adding, within every 24–48 hour period thereafter, additional ZSM-5 catalyst sufficient to maintain the target octane boost at the desired level, and wherein the total amount of ZSM-5 catalyst additive added in any 24–48 hour period is less than the ZSM-5 additive added during the first 24-hour addition period.

DESCRIPTION OF THE PREFERRED EMBODIMENT

Zeolites

Figure 1:
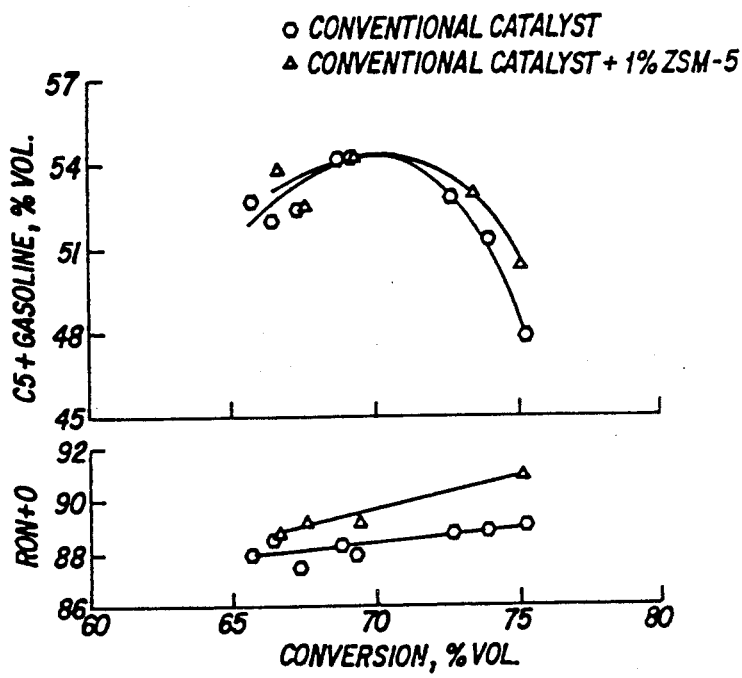
FIG. 1 is a graph illustrating the effect of a ZSM-5 catalyst in admixture with a conventional FCC catalyst with regard to $C_5^+$ gasoline yield and gasoline octane number (RON+O)

For purposes of this invention, the term "zeolite" is meant to represent the class of porotectosilicates, i.e., porous crystalline molecular silicate sieves that contain silicon and oxygen atoms as the major components. Other components may be present in minor amounts, usually less than 14 mole %, and preferably less than 4 mole %. These components include aluminum, gallium, iron, boron and the like, with aluminum being preferred, and used herein for illustration purposes. The minor components may be present separately or in mixtures.

The silica-to-alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica-to-alumina mole ratio of at least 10 are useful, it is preferred, in some instances, to use zeolites having much higher silica-to-alumina mole ratios, i.e., ratios of at least 500:1. In addition, zeolites, as otherwise characterized herein but which are substantially free of aluminum, i.e., having silica-to-alumina mole ratios up to and including infinity, are found to be useful and even preferable in some instances. Such "high silica" zeolites are intended to be included within this description. The novel class of zeolites, after activation, acquire an intra-crystalline sorption affinity for normal hexane, which is greater than that for water, i.e., they exhibit "hydrophobic" properties.

The members of the class of zeolites useful herein have an effective pore size of generally less than about 6 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of a particular zeolite solely from theoretical structural considerations.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,016,218, to which reference is made for details of the method.

Constraint Index (CI) values for some typical materials are:

|  | CI |
| --- | --- |
| ZSM-4 | 0.5 |
| ZSM-5 | 6–8.3 |
| ZSM-11 | 6–8.7 |
| ZSM-12 | 2 |
| ZSM-20 | 0.5 |
| ZSM-23 | 9.1 |
| ZSM-34 | 30–50 |
| ZSM-35 | 4.5 |
| ZSM-38 | 2 |
| ZSM-48 | 3.4 |
| TMA Offfretite | 3.7 |
| TEA Mordenite | 0.4 |
| Clinoptilolite | 3.4 |
| Mordenite | 0.5 |
| REY | 0.4 |
| Amorphous Silica-Alumina | 0.6 |
| Dealuminized Y (Deal Y) | 0.5 |
| Chlorinated Alumina | *1 |
| Erionite | 38 |
| Zeolite Beta | 0.6–1+ |

*Less Than

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables, such as crystal size of the zeolite, the presence of occluded contaminants, etc., may affect the Constraint Index. Therefore, it will be appreciated that it may be possible to so select test conditions as to establish more than one value for the Constraint Index of a particular zeolite. This explains the range of Constraint Indices for zeolites, such as ZSM-5 and ZSM-11.

Zeolite ZSM-5 is described in U.S. Pat. No. 3,702,886, and RE. No. 29,949, the disclosures of which are incorporated herein by reference.

Zeolite ZSM-11 is described in U.S. Pat. No. 3,709,979, the disclosure of which is incorporated herein by reference.

Zeolite ZSM-12 is described in U.S. Pat. No. 3,832,449, issued Aug. 27, 1974, the disclosure of which is incorporated herein by reference.

Zeolite ZSM-23 is described in U.S. Pat. No. 4,076,342, the disclosure of which is incorporated herein by reference.

Zeolite ZSM-35 is described in U.S. Pat. No. 4,016,245, the disclosure of which is incorporated herein by reference.

Zeolite ZSM-38 is described in U.S. Pat. No. 4,046,859, the disclosure of which is incorporated herein by reference.

Zeolite ZSM-48 is described in U.S. Pat. No. 4,397,827, the disclosure of which is incorporated herein by reference.

The preferred zeolites in this invention include those having the structure of ZSM-5, ZSM-11, ZSM-12, ZSM-23, ZSM-35, ZSM-38, ZSM-48 and TMA Offretite, with ZSM-5 being particularly preferred. Although each of the above-mentioned zeolites may act differently under various process conditions, for the purposes of this invention, the above-mentioned zeolites may be classified as "ZSM-5 type zeolites".

Members of the family of ZSM-5 zeolites possess a definite distinguishing crystalline structure whose X-ray diffraction pattern shows the following significant lines:

| Interplanar d-Spacing (A) | Relative Intensity ($I/I_o$) |
|---|---|
| 11.1 ± 0.3 | s |
| 10.0 ± 0.3 | s |
| 7.4 ± 0.2 | w |
| 7.1 ± 0.2 | w |
| 604 ± 0.2 | w |
| 6.04 ± 0.2 | w |
| 5.56 ± 0.1 | w |
| 5.01 ± 0.1 | w |
| 4.60 ± 0.08 | w |
| 4.25 ± 0.08 | w |
| 3.85 ± 0.07 | vs |
| 3.71 ± 0.05 | s |
| 3.04 ± 0.03 | w |
| 2.99 ± 0.02 | w |
| 2.94 ± 0.02 | w |

These values were determined by standard technique. The radiation was the K-alpha doublet of copper, and a diffraction equipped with a scintillation counter and a strip chart pen recorder was used. The peak heights, I, and the positions as a function of two times theta, where theta is the Bragg angle, were read from the spectrometer chart. From these, the relative intensities, 100 $I/I_o$, where $I_o$ is the intensity of the strongest line or peak, and d (obs.), the interplanar spacing in Angstrom units (A) corresponding to the recorded lines, were calculated. In the Table, the relative intensities are given in terms of the symbols w=weak, s=strong and vs=very strong. Ion-exchange of the sodium ions with cations reveals substantially the same pattern with some minor shifts in interplanar spacing and variation in relative intensity. Other minor variations can occur, depending on the silicon-to-aluminum ratio of the particular sample, as well as if it has been subjected to thermal treatment.

It is to be realized that the above CI values typically characterize the specified zeolites, but that such are the cumulative result of several variables used in the determination and calculation thereof. Thus, for a given zeolite exhibiting a CI value within the range of 1 to 12, depending on the temperature employed within the aforenoted range of 550° F. (290° C.) to 950° F. (570° C.), with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 550° F. to 950° F., the CI will have a value for any given zeolite of interest herein within the approximate range of 1 to 12.

The zeolites used in this invention may be in the hydrogen form or they may be base-exchanged or impregnated to contain a rare earth cation complement. Such rare earth cations comprise Sm, Nd, Pr, Ce and La. It is desirable to calcine the zeolite after base-exchange.

In a preferred aspect of this invention, the zeolites are selected as those having a crystal framework density, in the dry hydrogen form, of not substantially below about 1.6 grams per cubic centimeter. It has been found that zeolites which satisfy all three of these criteria are most desired. Therefore, the preferred selectivated zeolites of this invention are those having a Constraint Index as defined above of about 1 to 12, a silica-to-alumina mole ratio of at least about 10, and a dried crystal density of not substantially less than about 1.6 grams per cubic centimeter. The dry density for known structures may be calculated from the number of silicon plus aluminum atoms per 1000 cubic angstroms, as given, e.g., on page 19 of the article on *Zeolite Structure* by W. M. Meier. This paper is included in *Proceedings of the Conference on Molecular Sieves*, London, Apr. 1967, published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible that the unusual sustained activity and stability of this class of zeolites are associated with its high crystal anionic framework density of not less than about 1.6 grams per cubic centimeter. This high density, of course, must be associated with a relatively small amount of free space within the crystal, which might be expected to result in more stable structures. This free space, however, seems to be important as the locus of catalytic activity.

Crystal framework densities of some typical zeolites, including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5,-11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

Catalysts containing zeolites may be prepared in various ways. The catalyst may be separately prepared in the form of particles, such as pellets or extrudates, for example, and simply mixed in the required proportions. The particle size of the individual component particles may be quite small, for example, from about 20 to about 150 microns, when intended for use in fluid bed operation, or they may be as large as up to about ¼" for moving bed operation. Alternatively, the components may be mixed as powders and formed into pellets or extrudate, each pellet containing both components in substantially the required proportions.

Zeolite ZSM-5

A preferred intermediate pore zeolite for the present invention is ZSM-5. Much work with ZSM-5 has been reported in the patent literature on adding an intermediate pore size zeolite, e.g., ZSM-5, to the conventional cracking catalyst.

In U.S. Pat. No. 3,758,403, from 1½ to 10% ZSM-5 catalyst was added to a conventional cracking catalyst containing 10% REY, the remainder being Georgia clay. Examples were given showing use of 1.5, 2.5, 5 and 10 wt % ZSM-5 added to the conventional cracking catalyst. The ZSM-5 catalyst resulted in increasing production of dry gas, some loss of gasoline yield, and an increase in octane number.

ZSM-5 catalyst, especially virgin catalyst, has exceedingly high activity. Researchers have attempted to take advantage of the high activity of fresh ZSM-5 catalysts by adding only small amounts of it to FCC catalysts. Typical of such work is U.S. Pat. No. 4,309,280, the entire contents of which is incorporated herein by reference. This patent taught adding very small amounts of powdered neat ZSM-5 catalyst, characterized by a particle size less than 5 microns. This patent taught that adding as little as 0.25 wt % ZSM-5 powder to the circulating catalyst inventory in an FCC unit would increase dry gas production by 50% (from 3.9 wt % dry gas to 6.0 wt %; see Example 6 in Table 2).

To summarize the state of the art regarding addition of ZSM-5 to cracking catalyst, the following general statements can be made. ZSM-5 is exceedingly active, and addition of even small amounts results in greatly augmented production of dry gas, at the expense of gasoline yield.

Experimental work has shown that ZSM-5 catalyst, in FCC processes, loses activity relatively quickly. ZSM-5 is disproportionately active, compared to conventional FCC catalysts, from start-up to perhaps as much as a week of operation. After more than about a week of operation in an FCC unit, and after being subjected to repeated fluidized bed regenerations, in laboratory or in commercial units, the ZSM-5 activity weakens.

These factors, high initial activity of ZSM-5 coupled with rapid deactivation of ZSM-5, discouraged researchers from adding ZSM-5 to moving bed catalyst cracking units. The high start-up activity of ZSM-5 also results in voluminous production of light gases, which production is difficult to accommodate in downstream processing units designed to handle the product mix obtained from conventional catalyst. The rapid deactivation of ZSM-5 meant that its effect would soon be lost, requiring very expensive turnover of catalyst in the unit.

The problem of accommodating the initial high activity of ZSM-5 has been solved and is disclosed herein. Although other intermediate pore zeolites may be used in the process of the present invention, zeolite ZSM-5 will generally be referred to in this disclosure.

Selectivation Process

The present invention is particularly directed to increasing the octane number/$C_6^+$ (gasoline+distillate) fraction yield ratio by adding a catalyst having the structure of ZSM-5, which has been selectivated, to the catalytic cracking unit.

The catalytic cracking unit comprises a conventional cracking catalyst which is known to the art. The catalyst is a crystalline molecular sieve having sufficient acid activity to catalyze cracking of a hydrocarbon feed to produce a product containing a substantial fraction boiling in the gasoline boiling range. Examples include amorphous silica-alumina, crystalline silica-alumina, zeolite X, zeolite Y and naturally occurring faujasite.

Addition of a catalyst of the present invention, comprising one or more members of a class of selectivated zeolites, as defined hereinafter, in relatively small amounts when used in conjunction with a conventional cracking catalyst, is extremely effective as an octane and total yield improver. For purposes of this invention, the term "selectivated" refers to a zeolite catalyst which has been steam treated under conditions which are hereinafter disclosed.

Octane gain can be controlled to the extend desired by the introduction of only very small amounts of the selectivated zeolite. In commercial practice, the octane gain could be maximized or controlled to operate at full alkylation capacity. Octane increase can be varied with the content of the selectivated zeolite. If excess alkylation capacity is available, $C_5^+$ gasoline plus alkylate yields are higher when the selectivated zeolite is utilized, as compared to conventional commercial cracking catalysts, without sacrificing the octane increase.

The particular proportion of the selectivated zeolite introduced to the conventional cracking catalyst is an important feature, in that such a very small amount of selectivated zeolite is required to produce substantial octane gains without gasoline plus distillate yield loss. It has been found that only about 0.01 to 10.0 wt % of this class of zeolite need to be added to the conventional cracking catalyst in the unit under conventional cracking operations to increase octane by about 1 to 3

RON+O (research octane number without lead). The weight percent of the selectivated zeolite required in relation to the total quantity of conventional cracking catalyst in the unit preferably ranges between about 0.05 and about 5.0, and most preferably between 1.0 and 2.0. The exact weight percent will vary from cracking unit to cracking unit, depending on the desired octane number, total gasoline yield required, the available feedstock, and the content of active component in the conventional cracking catalyst.

An alternate method of expressing the required amount of selectivated zeolite is the weight ratio of the selectivated zeolite to the cracking component content, e.g., zeolite or silica-alumina content, of the conventional cracking catalyst. If expressed in this form, the amount of selectivated zeolite to the equivalent amount of cracking component, e.g., zeolite or silica-alumina, in the conventional cracking catalyst measured based upon when it was in fresh state, is in the range of between about 1:10,000 to about 1:10, and preferably from between about 1:2000 to about 1:200.

Selectivation occurs primarily in two ways. In one method, the zeolite may be selectivated by steaming under certain conditions specified herein prior to adding the zeolite to the catalytic reactor. The other method is to add the zeolite to be selectivated to the catalytic reactor unit and expose it to steaming conditions specified herein for a period of time sufficient to selectivate the catalyst. The selectivation process can occur in a number of catalytic cracking processes, such as those described hereinafter.

It should be noted that the conditions for selectivating the zeolites may be interdependent upon one another. For example, if the steaming process is at the lower end of the temperature scale, the steaming time should be increased as a compensation measure.

Suggested Explanation of Selectivation Concept

The selectivation process is achieved by partial pressure steaming of ZSM-5 type zeolite for a period of time so that, when admixed with conventional cracking catalyst, the catalyst converts a contacting hydrocarbon stream to a gasoline product having a high RON+O without a loss in gasoline plus distillate, i.e., $C_6^+$ fraction, yield. By "partial pressure steam" is meant that the treatment is undertaken in an atomsphere of less than 100% steam and thus steam may be admixed with oxygen or air or other gases generated during catalyst regeneration, as illustrated by the examples; accordingly, steam exerts a partial pressure, under the conditions of selectivation described and illustrated herein. Generally, the zeolite is reacted with steam at a partial pressure of about 0 to 45 psig, at a temperature of from about 400° to 1600° F. (205° to 870° C.), preferably 800° to 1450° F. (430° to 790° C.) for a period of time not less than 5 hours, preferably not less than 10 hours, and most preferably between 10 and 60 hours.

It is believed that this modified ZSM-5 type zeolite has acquired the ability to isomerize olefins. The theory can be stated as follows:

In order to fully explain these test results, the chemistry of octane enhancement being promoted by the ZSM-5 type zeolite must first be understood. The ZSM-5 type zeolite increases gasoline octane in catalytic cracking by cracking linear low octane components in the heavy end of the gasoline to lighter and more branched components. Such a mechanism is adequate to explain the performance during the addition of fresh ZSM-5 zeolite. Nevertheless, one must also consider the residual octane enhancement observed after fresh catalyst addition has ended. Based upon gasoline compositional data obtained independent of this commercial test, ZSM-5 is now known to isomerize low octane linear olefins to more highly branched and higher octane olefins.

We believe the activity enhancement catalyzed by fresh ZSM-5 catalyst addition is dominated by the first reaction, paraffin cracking. As the catalyst ages in the unit and equilibrates, the latter reaction mechanism, olefin isomerization, dominates as the cracking activity decreases, hence the residual octane enhancement activity observed.

Tests on a commercially-sized unit of ZSM-5 addition gave initial octane gains (3.5–4.5 RON+O and 2.0–2.5 MON+O) with corresponding gasoline losses of 2.0–2.5 vol % and $C_3^= + C_4^=$ increases of 3.0–4.0 vol %. There were no substantial increases in coke make observed. The increase in $C_3^= + C_4^=$, together with additional outside i—$C_4$, can be translated into increases in alkylate yield of 3.0–3.5 vol %. The octane enhancement decayed at a relatively slow rate after ZSM-5 addition has been terminated, indicating that ZSM-5 octane enhancement shifted from paraffin cracking to olefin isomerization. The cracking of low octane components in the heavy gasoline end is dominant with fresh catalyst, while olefin isomerization dominates as the catalyst ages.

ZSM-5 catalyst which has been modified by the process of the present invention is indistinguishable by any known X-ray or elemental analysis from conventional ZSM-5 catalyst.

Using the guidelines discussed hereafter, it is possible to take a ZSM-5 catalyst and determine if it has been modified, as disclosed in the present invention.

Conventional ZSM-5 catalyst, when added to conventional FCC catalyst, usually gives about 2 octane number gain/1 gasoline plus distillate % yield loss. In contrast, modified ZSM-5 catalyst of the present invention can give an octane number gain with little or no yield loss. Conventional ZSM-5 catalyst results in significantly increased dry gas production, while this is not seen with the modified ZSM-5 catalyst of the present invention.

The modified ZSM-5 catalyst behaves differently from conventional ZSM-5 catalyst. Much of the ZSM-5's acid activity and cracking activity is diminished, leading to reduced gas make and increased yield, at least in FCC units. It is believed that some paraffin cracking activity is lost.

Hydrocarbon Conversion Process Utilizing Selectivated Zeolites

The selectivated zeolite can be injected at any time during the catalytic cracking process. The zeolite can be added in the same catalyst particle as the cracking component, in a separate catalyst particle, or as a particle consisting in part or totally of ZSM-5 type crystals. The selectivated zeolite can be introduced while the cracking unit is down, or while the cracking unit is on on-stream operation. Once the selectivated zeolite is added to the cracking process, the refiner can return to conventional operation or an operation at lower octane number by eliminating or decreasing the use of selectivated zeolite. Thus, the increase in octane number over the number obtainable under conventional cracking operations can be controlled by controlling the amount of selectivated zeolite.

Catalytic cracking units which are amenable to the process of this invention operate within the temperature range of about 400° F. (205° C.) to 1600° F. (871° C.), and under reduced atmospheric or superatmospheric pressure. The catalytic cracking process may be operated batchwise or continuously. The catalytic cracking process can be either fixed bed, moving bed or fluidized bed, and the hydrocarbon chargestock flow may be either concurrent or countercurrent to the conventional catalyst flow. The process of this invention is particularly applicable to the fluid catalytic cracking (FCC) process.

Fluid Catalytic Cracking (FCC)

The FCC process is well known to the art and a detailed description thereof is not believed necessary. Although the design and construction of individual plants vary, the essential elements of an FCC unit are illustrated in U.S. Pat. No. 4,368,114, which is incorporated herein by reference.

Briefly, in the FCC process the catalyst is in the form of microspheres, which acts as a fluid when suspended in oil vapor or gas. The hydrocarbons contact the fluidized catalyst and are catalytically cracked to lighter products. The catalyst is deactivated by coke deposition, necessitating regeneration of coked catalyst in a regenerator.

As mentioned previously, it is a feature of the present invention that there is great flexibility in the way the selectivated zeolite may be added in the same catalyst particle as the cracking component, as a separate catalyst particle or as a particle consisting in part or totally of ZSM-5 type zeolites. Further, the selectivated zeolite may be added to the regenerator or, if present as small size particles, directly to the hydrocarbon feed.

The amount of selectivated zeolite required to increase gasoline octane number is generally based on the total quantity of conventional cracking catalyst in the unit, i.e., on the circulating inventory of conventional cracking catalyst. For example, if the selectivated zeolite is first introduced via the addition of fresh makeup catalyst, the amount of zeolite constituent in the additive catalyst required would be quite high if compared to the amount of fresh makeup catalyst added. However, after a period of time of fresh makeup catalyst addition, and once the amount of zeolite is maintained at the prescribed limits as compared to the circulating inventory of conventional cracking catalyst, the amount of said zeolite in the fresh makeup catalyst addition will be much lower than initially.

In general terms, the refiner will select a target octane number boost desired, and continue to add sufficient ZSM-5 catalyst to attain the desired octane boost. As a practical matter, it will be difficult to observe gains in octane of less than about one half octane number, setting an effective lower limit on octane boost that may be achieved. Usually 1.0 octane no. gain is the preferred target, it is enough of a gain that it can be readily observed in an operating refinery, while minimizing the change in operation of the unit. An octane boost of about 3.0 ON is probably the upper limit on octane boost which can be achieved by the present invention. Any octane boost of this magnitude, or higher, may result in significantly increased production of dry gas, overloading the wet gas compressor and downstream processing facilities. A number of variables are involved in determining the program of ZSM-5 addition:

Equilibrium Catalyst

If the equilibrium catalyst has been severly deactivated, the addition of ZSM-5 will have a bigger effect than if a more active equilibrium catalyst was present in the unit.

Most, but not all, FCC units operate with a catalyst comprising a large pore zeolite, typically a rare earth exchanged Y, or ultrastable Y zeolite in an amorphous matrix. Typically, the FAI activity of this catalyst will be 40 to 70.

Operating Conditions

The severity of the operation may have an effect upon target octane. Addition of a given amount of ZSM-5 catalyst to a unit operating at relatively low severity conditions may produce a different effect than addition of the same amount of ZSM-5 catalyst to a unit operating under very severe conditions.

Feedstock

Any conventional FCC feed may continue to be used as feed to the FCC unit during the practice of the present invention. The octane no. response of different feeds to ZSM-5 catalyst may be different.

ZSM-5 Activity

The acid activity, or cracking activity, of the ZSM-5 catalyst will vary greatly with silica/alumina ratio. In general, the more aluminum that is present, the more active acid sites on the catalyst. Conventional ZSM-5 catalyst loses activity fairly rapidly in an FCC unit, probably due to a steaming effect that occurs in the FCC regenerator.

ZSM-5 Activity Decay

The most important variable in determining a ZSM-5 addition rate is the rate of cracking activity decay of the ZSM-5 catalyst added to the cracking unit and particularly to an FCC unit.

If the catalyst cracking activity did not decline, but remained undiminished, there would be no need to practice the present invention. Addition of a given amount of ZSM-5 catalyst on the first day of operation would, without further ZSM-5 addition, achieve the desired boost in product octane number. Such operation, desirable as it may be, has never been attained so after about one day of operation more fresh ZSM-5 catalyst must be added to compensate for the loss in cracking activity of the ZSM-5 catalyst already in the FCC unit.

A preferred method of adding the selectivated catalyst to an FCC unit is disclosed in U.S. application Ser. No. 629,922, filed July 11, 1984 in the name of Chou et al, the entire contents of which are incorporated herein by reference. The basic approach is to add sufficient catalyst so that a preset octane gain is achieved. For purposes of describing the slug feeding operation, zeolite ZSM-5 will be used to exemplify the added catalyst. It is noted, however, that under proper conditions other catalysts may similarly be used.

The method of adding ZSM-5 additive catalyst to the catalyst inventory of a fluidized catalytic cracking unit incorporates determining a target octane number boost desired, generally at least equivalent to an increase of 0.5 research octane number, in the gasoline fraction of the FCC product stream; making a first addition of ZSM-5 additive within a period of no more than about 24 hours to produce the desired target octane boost; adding, within every 24–48 hour period thereafter, additional ZSM-5 catalyst sufficient to maintain the target octane boost at the desired level, and wherein the total amount of ZSM-5 catalyst additive added in any 48-hour period is less than the ZSM-5 additive added during the first 24-hour addition period.

More specifically, the process for adding ZSM-5 catalyst to an FCC unit containing an inventory of equilibrium catalyst incorporates adding ZSM-5 catalyst to the equilibrium catalyst, wherein the weight percent of ZSM-5 zeolite added to the catalyst is equal to 1 to 20 wt % of the equilibrium catalyst and sufficient to increase the research octane number of the FCC gasoline product from 0.5 to 2.0 octane numbers, and wherein the ZSM-5 addition is completed within a single 24-hour period; adding thereafter, on a daily basis for at least a 1-week period, additional ZSM-5 catalyst in gradually reducing increments, the additional ZSM-5 catalyst being sufficient to maintain the desired increase in product octane number, whereby an FCC gasoline fraction with increased product octane is produced as a product of the process.

A typical ZSM-5 addition rate necessary to achieve a constant increase in octane will be given. The precise addition rates are dependent upon all of the variables discussed above. The basic operating conditions for this exercise are listed below.

1. Equilibrium catalyst
   13% REY in a silica/alumina matrix
   average particle size 40 to 120 microns,
   58 FAI activity.
2. ZSM-5 additive—the additive consisted of 25 wt % HZSM-5 (which had not been subjected to steaming or calcining) in a silica/alumina matrix (75 wt %). The FAI activity of the additive composite (which is a mixture of ZSM-5 and silica/alumina) was around 68.
3. FCC operating conditions, including regeneration conditions, are shown in Table A.
4. Feedstock properties are also shown in Table A.

TABLE A

| | |
|---|---|
| Fresh Feed, TBD | 15.3 |
| C/O | 6.6 |
| Riser Top Temp., °F. | 967 |
| Maximum Regenerator Temp. °F. | 1310 |
| Preheat Temp., °F. | 735 |
| Catalyst Activity, FAI | 58 |
| Catalyst Inventory, Tons | 60 |

Charge Stock Characterization

TABLE A-continued

| | |
|---|---|
| API | 21.8 |
| S, wt % | 0.5 |
| Molecular weight | 375 |
| Basic Nitrogen, ppm | 570 |
| $C_A$ wt % | 17.3 |
| CCR, wt % | 0.06 |

Based on these assumptions, the wt % additive necessary to achieve a 1.5 octane no. boost is presented hereafter in Table 2. This is a projection based upon pilot plant results, and mathematical models, it does not represent an actual commercial scale test.

TABLE 2

Example of ZSM-5 Catalyst Makeup +1.5 Research Octane Increase

| From (Day) | To (Day) | Additive Makeup Rate as % of Inventory Per Day | ZSM-5 Makeup Rate as % of Inventory Per Day* | ZSM-5 Makeup Rate as % of Inventory Per Day** |
|---|---|---|---|---|
| 0 | 1 | 3.6–3.7 | 0.9 | 0.75 |
| 1 | 3 | 0.96 | 0.24 | 0.192 |
| 3 | 6 | 0.70 | 0.175 | 0.140 |
| 6 | 12 | 0.60 | 0.15 | 0.120 |
| 12 | 18 | 0.52 | 0.13 | 0.108 |
| 18 | 30 | 0.46 | 0.115 | 0.092 |
| 30+ | | 0.38 | 0.095 | 0.08 |

*With additive comprising 25 weight percent ZSM
**With additive comprising 20 weight percent ZSM-5

The reason that additive amounts are reported in two ways is that the additive comprises only a portion of ZSM-5, with the remainder being a silica/alumina binder. The silica/alumina is not inert, it has some cracking activity, so for completeness both the ZSM-5 portion added, and the total additive (consisting of ZSM-5 plus its binder) is reported above.

The addition rate does take into account the small amounts of ZSM-5 present in the circulating catalyst removed as additional catalyst is added. However, it does assume that both catalysts attrite from the unit at the same rate.

The equilibrium ZSM-5 additive catalyst has a much lower FAI activity than does the equilibrium catalyst, so eventually more fresh REY cracking catalyst must be added to maintain overall catalyst activity in the unit at a predetermined level.

This dilution effect, of the REY zeolite conventional cracking catalyst with the additive, can be minimized either by using a more concentrated ZSM-5 additive catalyst, or incorporating some conventional REY zeolite into the additive catalyst so that the overall FAI activity of a unit is not changed. The additive dilution effect could be largely avoided by using as an additive catalyst a ZSM-5+ matrix which contained, on an overall weight percent basis, about 12% REY.

After cracking, the resulting product gas is compressed and the resulting products may suitably be separated from the remaining components by conventional means, such as adsorption, distillation, etc.

Hydrocarbon chargestocks undergoing cracking in accordance with this invention comprise hydrocarbons generally and, in particular, petroleum fractions having an initial boiling range of at least 400° F. (205° C.), a 50% point of at least 500° F. (260° C.), and an end point of at least 600° F. (315° C.). Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. (400° C.) must be carried out under vacuum in order to avoid thermal cracking. The boiling temperatures utilized herein are expressed, for convenience, in terms of the boiling point corrected to atmospheric pressure.

Moving Bed Catalytic Cracking

This process was introduced in the early 1940's and a detailed description thereof is not believed necessary.

Briefly, the process uses a moving bed of catalytic cracking catalyst. Catalyst moves from the catalytic cracking reactor to a moving bed regenerator, and from there back to the reactor.

The oil chargestock, usually without added hydrogen, is passed over the moving bed of catalyst and is catalytically cracked to lighter products. During catalytic cracking, the catalyst is deactivated by coke deposition. Coke deposition is removed from the catalyst in a moving bed regenerator associated with the moving bed cracking unit.

Moving Bed Regeneration

Moving bed catalytic cracking or Thermofor Catalytic Cracking (TCC) units have moving bed catalyst regeneration units associated therewith. The catalyst is generally maintained as a downflowing moving bed of catalyst. The catalyst may be disposed as an annular bed, with radial in or out gas flow. The moving catalyst bed may have the cross-section of a circle or a rectangle with gas flow from the lower portion of the catalyst bed to the upper, or the reverse. Alternatively, gas flow may be across the moving bed of catalyst, or some combination of cross-flow, downflow and upflow.

It is preferred to have a moving bed of catalyst going down, with gas flow generally in an upward direction.

Although the catalyst from the moving bed catalytic cracking unit is usually stripped before being sent to the regenerator, there is usually a small amount of hydrocarbon, and hydrogen-containing coke, contained on the catalyst. This material is relatively easy to burn, and is usually burned from the catalyst in the top 5–10% of the moving bed catalyst regeneration unit. Usually more severe conditions are necessary to completely remove the more refractive, relatively hydrogen-free coke that remains on the catalyst after hydrocarbons are burned off, so progressively more severe operating conditions are experienced in the lower portions of the moving bed. These conditions may be in the form of increased temperature, increased oxygen concentration, or both.

Much, if not all, of the heat required for catalyst regeneration is obtained by burning coke, and to a lesser extent, the light hydrocarbons that happen to be present on the catalyst. For start-up, or to adjust temperatures in the regenerator, an air preheater may be used. It is also possible to provide various heat exchange arrangements, e.g., incoming cool gas against hot exhaust gases, using hot exhaust gases to preheat catalyst, using hot regenerated catalyst as a source of incoming cool regeneration gas, etc. The conditions used in the moving bed catalyst regeneration units are highly conventional—whatever temperatures, pressures, oxygen partial pressures have been found satisfactory in the past are believed to be satisfactory for use in the present invention.

In very general terms, regeneration conditions in the moving bed regeneration should be adjusted so that at least half of the H$_2$O precursors are burned off in at least the top half of the bed, and preferably in the top 5–10% of the moving bed of catalyst in the catalyst regeneration zone. Conditions should not be severe enough to remove more than 50% of the coke from the catalyst in the top 5–10% of the moving bed regeneration zone, and preferably 60–90% of the coke remains on the catalyst after the H$_2$O precursors have been burned away.

Suitable regeneration conditions include temperatures of about 400° to 1400° F., preferably 800° to 1200° F.

Regeneration pressure may range from subatmospheric to 10 atmospheres, or higher, if desired. Usually regeneration is conducted at pressures slightly above atmospheric. Oxygen concentration may range from about ½ mole % O$_2$ to the oxygen content of air, or higher. High oxygen concentrations lead to high catalyst regeneration temperatures which may deactivate the catalyst. Regeneration with 1 to 20 mole % O$_2$ is preferred. Preferably, the regeneration gas is inserted at a point about 30% into a moving, annular bed of catalyst, with stack gas removed from above and below the moving bed.

No way is known today to duplicate this regeneration procedure in an FCC unit, although it may be possible to modify FCC regeneration procedures to achieve this, i.e., staged regeneration where most of the water precursors are burned off at low temperatures, before coke combustion.

It is believed that other methods will be developed to quickly produce ZSM-5, with the properties obtainable now, only after weeks and months of aging and regeneration in a moving bed catalytic cracking unit.

Catalyst Preparation by Regeneration

Modified ZSM-5 catalyst can be obtained by periodically replacing some of the circulating inventory of moving bed catalytic cracking catalyst, and processing the catalyst to recover the ZSM-5 catalyst, or simply using the extrudate catalyst (with or without additional modifiers, hydrogenation/dehydrogenation components) for the desired catalytic use.

Preferably, the aged, selectivated ZSM-5 catalyst is obtained downstream of the moving bed catalyst regeneration process, where it is essentially coke free. It is also acceptable to obtain the ZSM-5 containing catalyst downstream of the reactor and upstream of the moving bed regeneration zone. If this is done, because of the presence of relatively large amounts of coke on the catalyst in such circumstance, it will usually be necessary to subject the catalyst to conventional regeneration techniques prior to use.

If TCC units are run to produce selectivated ZSM-5 catalyst, rather than improved TCC operation, some modifications to TCC operation may be permitted. Relatively high concentrations of ZSM-5 may be added, e.g., 10–100 wt %, preferably 20 to 80 wt % ZSM-5 catalyst content may be used. The ZSM-5 catalyst added may have a smaller or larger particle size than the conventional catalyst, or a different L/D. The binder, or amorphous material used to give the catalyst strength and attrition resistance may be modified to optimize end use of the catalyst in some process other than TCC. Thus, the binder may be inert, or all alumina, or some other material compatible with future catalytic use of the modified ZSM-5.

Method of Adding ZSM-5 Type Catalyst to Moving Bed Catalytic Cracking Unit

The foregoing process describes a method to effect a relatively rapid changeover of catalyst inventory from a conventional catalyst to a ZSM-5 type containing catalyst in a unit.

The cracking catalyst used herein can be any conventional cracking catalyst now used or hereafter developed. Relatively large pore zeolites in clay or other matrix material are preferred. It is also possible, and acceptable, to use ultrastable Y, ultrahydrophobic Y, and other conventional large pore catalytic cracking materials.

Suitable cracking catalysts contain 1 to 30 wt % large pore zeolite material, preferably a low sodium, rare earth-exchanged Y-type (REY) zeolite. Very good results are obtained when the catalyst has 5 to 15 wt % REY zeolite in the matrix.

Preferably, the equilibrium catalyst is a conventional TCC catalyst which contains from about 0.5 to 20 wt % ZSM-5. Preferably, the equilibrium TCC catalyst will contain 0.1 to 20 wt % ZSM-5, preferably with 1 to 7 wt % ZSM-5.

The equilibrium catalyst may be in any size and shape which has been suitable for moving bed catalytic cracking, and may be either amorphous or zeolitic. Preferably, it is a zeolitic catalyst in an amorphous base. Very good results are obtained when the conventional TCC catalyst contains from 8 to 16, and preferably 10 to 12 wt % REY zeolite in a clay base.

The equilibrium catalyst can be in the form of oil dropped spheres, prilled balls, pills or extrudates.

The changeover catalyst, as distinguished from the equilibrium ZSM-5 catalyst, is relatively rich in ZSM-5.

Preferably, the ZSM-5 rich catalyst, or changeover catalyst, contains 1.5 to 10 times the amount of ZSM-5 contained in the equilibrium catalyst.

If it is desired to operate the TCC unit with a 2.5 wt % ZSM-5 catalyst level in the circulating catalyst inventory, the changeover catalyst may contain 3.75 to 25 wt % ZSM-5.

If it is desired to operate with an equilibrium ZSM-5 level of 5.0 wt % in the circulating catalyst inventory, the changeover catalyst might contain from 7.5 to 50 wt % ZSM-5.

Especially good results are obtained when the changeover catalyst contains about 1.75 to 4 times as much ZSM-5 as the equilibrium catalyst.

Very good results are obtained when the changeover catalyst contains approximately two to three times as much ZSM-5 as the equilibrium catalyst.

It is preferred, but not essential, to reduce somewhat the amount of large pore zeolite in the changeover catalyst. The ZSM-5 is meant to be an additive to the conventional large pore zeolite, rather than a total replacement for the large pore zeolite. It is believed that best results are achieved when the large pore zeolite, e.g., REY, content is reduced to compensate for the cracking activity afforded by the ZSM-5. In general, ZSM-5 can act as a partial substitute for the REY zeolite on a 1:1 to a 1:10 basis. Preferably, 2 wts of ZSM-5 will replace 1 wt of conventional zeolite in the catalyst.

If the conventional TCC catalyst contains 12% REY, and 2% ZSM-5 was added to the changeover catalyst, it would be beneficial to reduce the REY content from 12 wt % to 11 wt %. The total zeolite content of the changeover catalyst would increase slightly (from 12 wt % REY to 13 wt %, consisting of 11 wt % REY plus 2 wt % ZSM-5), but the overall catalytic activity of the catalyst would not change greatly.

If the changeover catalyst contains 5% ZSM-5, it would be beneficial to reduce the REY content of the changeover catalyst from 12 wt % down to 9-10 wt % REY.

Changeover catalyst addition can be done on any convenient schedule, e.g., removing from 0.25 to 20% per day. It can be done on a very slow basis, replacing, e.g., the 0.25 wt % per day of the catalyst inventory lost due to attrition and catalyst circulation with changeover catalyst. The only disadvantage to such approach is that it would take a long time to see the ZSM-5 in the unit.

Although there is no constraint, other than economics, on how slowly the ZSM-5 is added, there is a constraint regarding how fast the changeover catalyst is added. Because of the very high activity of the ZSM-5 catalyst, you could not simply dump the entire catalyst inventory and replace it with changeover catalyst. The hyperactivity of the virgin ZSM-5 catalyst would result in unacceptable amounts of gas production. Because the virgin ZSM-5 catalyst is so active, it would not even be possible to operate with an equilibrium level ZSM-5 catalyst, without experiencing difficulties in accommodating all the gas production that would occur with the superactive virgin ZSM-5 catalyst.

As long as at least about a week is allowed, the greatest difficulties experienced due to adding changeover catalyst with a lot of fresh ZSM-5 catalyst, will be avoided. It is better to take longer to complete the changeover catalyst addition.

Preferably, from ½ to 10 wt % per day of the circulating catalyst inventory is replaced with changeover catalyst. Most beneficial changeover schedule is probably 1 to 5% per day of catalyst inventory. This permits a very smooth transition from conventional catalyst to ZSM-5 containing catalyst with minimal disruption of downstream processing units, especially gas handling facilities.

After the desired amount of changeover ZSM-5 catalyst has been added to the TCC catalyst inventory, ZSM-5 maintenance, rather than addition, can be practiced.

By ZSM-5 maintenance is meant the addition of sufficient ZSM-5 catalyst, and conventional cracking catalyst, to maintain at approximately a steady state level the ZSM-5 content of the TCC catalyst inventory.

If the desired equilibrium in ZSM-5 level is, e.g., 2.5 wt %, this level can be maintained by adding equilibrium catalyst containing 2.5 wt % ZSM-5 and the desired amount of large pore zeolite. It is also possible to stimulate equilibrium catalyst addition by, e.g., mixing on a 50—50 basis, changeover catalyst with conventional (non-ZSM-5 containing) cracking catalyst. Alternatively, catalyst addition for one day can be of ZSM-5 rich catalyst (changeover catalyst) followed by one or two days of conventional (non-ZSM-5 containing) cracking catalyst addition.

The distinction between changeover catalyst and equilibrium catalyst is the same distinction between attaining a desired ZSM-5 concentration in the catalyst and maintaining that concentration once it has been attained.

The following examples will serve to illustrate the process of the invention without limiting the same.

EXAMPLES

The following examples show how to make modified ZSM-5 catalyst, and illustrate the different catalytic effect obtained by using modified ZSM-5 catalyst in a moving bed catalytic cracking unit.

Example 1

This process was tested in a commercial size TCC unit.

Operating conditions are shown below:

| | | |
|---|---|---|
| Fresh Feed Rate | 13,400 | BPD* |
| Recycle | 0 | |
| Catalyst Circulation | 397 | TPH* |
| Catalyst/Oil | 4.44 | wt/wt |
| Reactor Vapor Outlet Temp. | 903° F. | |
| Catalyst Activity (CAT-D) | 53.8 | |

BPD-Barrels Per Day
TPH-Tons Per Hour

This unit had a 347-ton catalyst inventory.

The conventional catalyst in the unit had the following specifications:

| Durabead 10A | |
|---|---|
| Wt % REY | 12.0% |
| Bead Diameter | 0.36–0.70 cm |

The changeover catalyst had the following properties:

| | |
|---|---|
| Wt % ZSM-5 | 5% |
| Wt % REY | 7.5% |
| Bead Diameter | 0.36–0.70 cm |

During normal operation, this unit required makeup catalyst rates of about 1¼ ton/day (t/d). The makeup catalyst rate is set to satisfy those catalyst losses due to attrition, and also to maintain catalyst activity.

Catalyst addition during the ZSM-5 test was usually maintained at 1–2 t/d, although there were short periods of addition rates as high as 4 t/d.

Results of the test are reported hereafter in Table 1.

Feed properties are reported hereafter. The numbers reported are approximate because the feed was a blend of different crudes, and the blend varied somewhat.

| Feed Properties | | |
|---|---|---|
| | Test Results | |
| Test | Test Method | Test Results |
| Pour Point, °F. | D 97 | 85 |
| Carbon Residue Conradson | D 189 | 0.31 |
| Kinematic Viscosity 40C | D 445-3 | 40.55 |
| Kinematic Viscosity 100C | D 611 | 164.5 |
| Bromine No. | D1159 | 6.8 |
| Refractive Index Liquids | D1218-9 | 1.49000 |
| API Gravity | D1298-3 | 23.0 |
| Molecular Weight | | 353 |
| Sulfur by XRF, 0.002–5% | | 1.65 |
| Hydrogen-Micro Pregl. | | 12.37 |
| Nickel by AA | | 0.25 ppm |
| Vanadium by AA | | 0.70 ppm |
| Iron by AA | | 3.15 ppm |
| Copper by AA | | 0.10 ppm |
| Sodium by AA | 2.95 ppm | |
| Nitrogen-Microdumas | | .16% |

Reduced Pressure Distillation D1160

| Feed Properties | |
|---|---|
| % (Vol) Over | °F. at 760 |
| IBP | 428 |
| 5 | 615 |
| 10 | 665 |
| 20 | 718 |
| 30 | 750 |
| 40 | 781 |
| 50 | 808 |
| 60 | 835 |
| 70 | 865 |
| 80 | 903 |
| 90 | 950 |
| 95 | 983 |
| EP | 990 |

TABLE 1

| Reactor Effluent Surveys | | | | | | | |
|---|---|---|---|---|---|---|---|
| Time on Stream, Days | 0 | | 72 | | 92 | | 106 |
| Added Catalyst, Tons | 0 | | 125 | | 177 | | — |
| Reactor Effluent Test Results[1] | | | | | | | |
| | | | d | | d | | d |
| Conversion, % Vol | 53.0 | 53.0 | | 53.0 | | 53.0 | |
| $C_5$ + Gasoline, % Vol | 42.3 | 40.9 | −1.4 | 40.1 | −2.2 | 41.0 | −1.3 |
| $C_4^-$, Wt % | 12.5 | 14.1 | +1.6 | 13.6 | +1.1 | 12.2 | −0.3 |
| $C_4^=$, % Vol | 3.8 | 4.6. | +0.8 | 4.6 | +0.8 | 4.2 | +0.4 |
| $C_3^=$, % Vol | 3.7 | 4.7 | +1.0 | 4.8 | +1.1 | 4.2 | +0.5 |
| Potential Alkylate, % Vol | 12.7 | 15.7 | +3.0 | 15.9 | +3.2 | 14.2 | +1.5 |
| Add'l i-$C_4$'s Req'd, % Vol | 4.1 | 6.2 | +2.1 | 6.1 | +2.0 | 5.5 | +1.4 |
| LFO, % Vol | 29.9 | 29.1 | −0.8 | 29.3 | −0.6 | 26.4 | −3.5 |
| Octane No. | | | | | | | |
| R + O | 86.0 | 90.2 | +4.2 | 90.5 | +4. | 91.2 | +5.2 |
| M + O | 77.4 | 79.2 | +1.8 | 79.6 | +2.2 | 79.5 | +2.1 |

[1]Normalized to same conversion, RVOT and feed properties

Discussion of Example 1

The circulating catalyst had, on average, slightly less than 2.5 wt % ZSM-5. Roughly half the catalyst inventory had been replaced with changeover catalyst which was rich in ZSM-5.

Conventional catalyst addition continued after a 2.5 wt % ZSM-5 level had been obtained. This was primarily to make up for normal attrition losses. This catalyst addition averaged roughly about ½% per day of catalyst inventory. This makeup catalyst added had no ZSM-5 added. The reason for this was to obtain information regarding decay characteristics of the ZSM-5 containing catalyst.

From the data in the Table, it can be seen that the technique afforded by the present invention permitted a very smooth transition from conventional operation to ZSM-5 promoted catalytic cracking. At no time did the unit, or downstream gas processing facilities, have to suffer through production of copious amounts of dry gas.

Somewhat surprisingly, the ZSM-5 addition technique of the present invention resulted in significantly less dry gas production than would have been anticipated from the prior art. The data in Table 1 show that the production of light gases goes up by less than 10%, with the addition of 2.5 wt % ZSM-5. In the prior art patents, where fresh powdered ZSM-5 catalyst was added, addition of 0.25 wt % ZSM-5 resulted in an approximately 50% increase in dry gas production.

It is surprising that in practicing the present invention it was possible to add 10 times as much ZSM-5 (2.5 wt % vs. 0.25 wt %), while producing even less incremental light ends production, than did the prior art process.

The effect is not simply one of catalyst deactivation. If the ZSM-5 catalyst addition scheme of the present invention was merely so slow and drawn out as to result in the death of the entire inventory of ZSM-5 catalyst, there would be no increase in product octane number, and yet a very substantial octane number increase was achieved.

Example 2

Laboratory Evaluation

Laboratory tests were conducted using ZSM-5 catalyst in a standard laboratory test apparatus designed to stimulate a moving bed cracking operation.

Feedstock Properties

The feedstock was a gas oil fraction having an API gravity of about 23° with the approximate properties reported earlier.

Changeover Catalyst

The changeover catalyst used in the laboratory test was the same changeover catalyst used in Example 1.

The catalyst addition scheme used was designed to rapidly bring the ZSM-5 content of the circulating or equilibrium catalyst to the desired level well before 72 days of operation.

TABLE 2

Laboratory Evaluation Catalyst Samples

| Days | 0 | 72 d | | 92 d | |
|---|---|---|---|---|---|
| Conversion, % Vol | 50 | 50 | — | 50 | — |
| Gasoline, % Vol | 41.6 | 39.6 | −2.0 | 39.8 | −1.7 |
| $C_4^=$, % Vol | 2.9 | 3.5 | +0.6 | 3.5 | +0.6 |
| $C_3^=$, % Vol | 3.0 | 4.1 | +1.1 | 4.1 | +1.1 |
| Potential Alkylate, % Vol | 9.9 | 12.9 | +3.0 | 12.9 | +3.0 |
| Add'l i-$C_4$'s Req'd, % Vol | 2.8 | 4.2 | +1.4 | 4.0 | +1.2 |
| Octane No. R + O | 83.5 | 85.5 | +2.0 | 85.5 | +2.0 |
| Days | 106 d | | 158 d | | 226 |
| Conversion, % Vol | 50 | — | 50 | — | 50 | — |
| Gasoline, % Vol | 38.8 | −2.7 | 40.9 | −0.7 | 41.5 | −0.1 |
| $C_4^=$, % Vol | 3.7 | +0.8 | 3.3 | +0.4 | 3.0 | +0.1 |
| $C_3^=$, % Vol | 4.3 | +1.3 | 3.7 | +0.7 | 3.8 | +0.8 |
| Potential Alkylate, % Vol | 13.5 | +3.6 | 12.0 | +2.1 | 11.6 | +1.7 |
| Add'l i-$C_4$'s Req'd, % Vol | 4.3 | +1.5 | 4.1 | +1.3 | 4.0 | +1.2 |
| Octane No. R + O | 85.7 | +2.2 | 84.5 | +1.0 | 84.1 | +0.6 |

EXAMPLES 3-8

In the following examples, the conventional cracking catalyst used as a comparative example and to which the selectivated zeolite catalyst was added is a commercially available FCC cracking catalyst FS-30 (Na=0.56 wt %, $RE_2O_3$=2.97 wt %) produced by the Harshaw-Filtrol Corp, and was equilibrated through use in a commercial FCC unit. The active component of FS-30 is Y zeolite. In order to improve the stability of the catalyst, the zeolite is exchanged with a rare earth element, e.g., lanthanum, cerium, etc. Any rare earth oxide may be utilized in the catalyst; hence, the designation $RE_2O_3$ for rare earth oxide.

Example 3

This example illustrates the improved performances of selectivated catalysts with increased steaming.

An additive catalyst containing ZSM-5 was prepared by spray drying 25 wt % ZSM-5 in a semi-synthetic $SiO_2/Al_2O_3$/clay matrix ($SiO_2/Al_2O_3$/clay=79.05/5.95/15). The ZSM-5 containing catalyst was then steamed at 1350° F. (732° C.) and 1450° F. (788° C.) for 5, 10 and 15 hours in a 45% steam/55% air, 0 psig atmosphere. The steamed additive catalysts were then combined with the conventional cracking catalyst - equilibrium FS-30- in proportions to yield catalysts containing 1% and 2% ZSM-5. The catalyst composite and the FS-30 catalyst (comparative example) were contacted with Joliet Sour Heavy Gas Oil (JSHGO, properties given in Table 3 below) in a fixed-fluidized bed bench unit at 960° F. (515° C.), 20 WHSV hr$^{-1}$, and catalyst/oil (cat/oil) ratio of 3. The results of the individual runs are given below in Table 4.

TABLE 3

| Chargestock | Joliet Sour Heavy Gas Oil (JSHGO) |
|---|---|
| Gravity, °API | 24.3 |
| Aniline Pt., °F. | 171 |
| Sulfur, wt % | 1.87 |
| Nitrogen, wt % | 0.10 |
| Basic Nitrogen, ppm | 327 |
| Conradson Carbon, wt % | 0.28 |
| Viscosity, KV at 210° F. | 3.6 |
| Bromine No. | 4.2 |
| R.I. at 70° F. | 1.5080 |
| Hydrogen, wt % | 12.3 |
| Molecular Weight | 358 |
| Pour Point, °F. | 85 |
| Paraffins, wt % | 23.5 |
| Naphthenes, wt % | 32.0 |
| Aromatics, wt % | 44.5 |
| $C_A$, wt % | 18.9 |

TABLE 4

Effect of 1450° F. Partial Pressure Steaming of ZSM-5 FCC Additive

| Catalyst | Equil. FS-30 | FS-30 +1% ZSM-5 | FS-30 +2% ZSM-5 | FS-30 +1% ZSM-5 | FS-30 +2% ZSM-5 |
|---|---|---|---|---|---|
| Steaming Condition | | | | | |
| Time, Hrs | — | 5.0 | 5.0 | 10.0 | 10.0 |
| Temperature, °F. | — | 1450 | 1450 | 1450 | 1450 |
| Yields | | | | | |
| Conversion, % Vol | 68.0 | 64.8 | 64.1 | 67.6 | 66.4 |
| $C_5^+$ Gasoline, % Vol | 53.0 | 49.5 | 48.5 | 52.6 | 51.7 |
| Total $C_4$'s, % Vol | 15.2 | 14.7 | 15.4 | 15.4 | 15.0 |
| Dry Gas, Wt % | 7.5 | 7.7 | 7.4 | 7.4 | 7.5 |
| Coke, Wt % | 4.2 | 3.9 | 4.0 | 4.0 | 4.0 |
| RON + O, $C_5^+$ Gasoline | 88.1 | 89.7 | 89.0 | 89.2 | 89.2 |
| RON + O, $C_5^+$ Gasoline | — | +1.6 | +0.9 | +1.1 | +1.1 |

TABLE 4-continued

| | | | | | |
|---|---|---|---|---|---|
| $C_5^+$ Gasoline Yield/ RON + O | — | −0.8 | −2.0 | −0.1 | −0.2 |

Effect of 1350° F., Partial Pressure Steaming of ZSM-5 FCC Additive

| Catalyst | Equil. FS-30 | FS-30 +1% ZSM-5 | FS-30 +2% ZSM-5 | FS-30 +1% ZSM-5 | FS-30 +2% ZSM-5 | FS-30 +1% ZSM-5 | FS-30 +2% ZSM-5 |
|---|---|---|---|---|---|---|---|
| Steaming Condition | | | | | | | |
| Time, Hrs | — | 5.0 | 5.0 | 10.0 | 10.0 | 15.0 | 15.0 |
| Temperature, °F. | — | 1350 | 1350 | 1350 | 1350 | 1350 | 1350 |
| Yields | | | | | | | |
| Conversion, % Vol | 68.0 | 69.1 | 66.0 | 68.4 | 67.1 | 68.0 | 65.3 |
| $C_5^+$ Gasoline, % Vol | 53.0 | 52.7 | 48.3 | 49.5 | 47.5 | 51.2 | 49.6 |
| Total $C_4$'s, % Vol | 15.2 | 16.5 | 16.0 | 18.4 | 18.3 | 16.1 | 15.6 |
| Dry Gas, Wt % | 7.5 | 7.9 | 8.2 | 8.4 | 8.8 | 7.9 | 7.5 |
| Coke, Wt % | 4.2 | 4.7 | 5.0 | 4.2 | 4.4 | 4.3 | 3.9 |
| RON + O, $C_5^+$ Gasoline | 88.1 | 88.5 | 89.6 | 90.8 | 90.1 | 89.3 | 88.9 |
| RON +O | — | +0.4 | +1.5 | +2.7 | +2.0 | +1.2 | +0.8 |
| $C_5^+$ Gasoline Yield/ RON + O | — | −2.8 | −2.2 | −1.4 | −2.5 | −1.5 | −1.9 |

Example 4

In order to substantiate the results of Example 3, the catalyst composite containing 1% ZSM-5 which had been steamed for 10 hours at 1450° F. was tested at a number of different conversions by varying the catalyst to oil ratio (cat/oil) at 960° F. using the unit and chargestock described with respect to Example 3. Detailed run results are illustrated in Tables 5 and 6. Estimates derived by interpolating the results of these runs to a constant conversion are illustrated in Table 7.

TABLE 5

Catalyst: Equilibrium FS-30

| Run Number | 1 | 2 | 3 | 4 | 5 | 6 | 7 | 8 |
|---|---|---|---|---|---|---|---|---|
| Conversion, % Vol | 75.3 | 74.0 | 72.7 | 69.3 | 68.8 | 67.4 | 66.4 | 65.7 |
| $C_5^+$ Gasoline, % Vol | 48.0 | 51.3 | 52.8 | 54.3 | 54.1 | 52.5 | 52.1 | 52.7 |
| Total $C_4$, % Vol | 19.7 | 19.4 | 18.4 | 15.8 | 16.0 | 14.9 | 14.8 | 14.0 |
| Dry Gas, Wt % | 12.0 | 9.9 | 8.9 | 7.3 | 6.9 | 7.3 | 7.4 | 7.4 |
| Coke, Wt % | 8.53 | 6.85 | 5.53 | 3.90 | 4.33 | 4.61 | 3.74 | 3.42 |
| n-$C_4$, % Vol | 2.1 | 2.2 | 1.8 | 1.3 | 1.3 | 1.1 | 1.0 | 1.0 |
| i-$C_4$, % Vol | 10.6 | 9.7 | 9.0 | 7.1 | 7.9 | 6.9 | 7.2 | 6.5 |
| $C_4=$, % Vol | 7.0 | 7.5 | 7.7 | 7.3 | 6.8 | 6.9 | 6.6 | 6.5 |
| $C_3$, % Vol | 4.7 | 3.6 | 2.9 | 2.0 | 2.4 | 2.2 | 2.2 | 2.2 |
| $C_3=$, % Vol | 9.2 | 7.8 | 7.6 | 6.8 | 5.4 | 6.4 | 7.0 | 6.6 |
| $C_5^+$ Gasoline + Alkylate, % Vol | 74.9 | 76.9 | 78.4 | 77.9 | 74.6 | 74.7 | 74.7 | 74.5 |
| Outside i-$C_4$, % Vol | 7.9 | 7.8 | 8.4 | 9.0 | 6.0 | 8.2 | 8.2 | 8.3 |
| RON + O, $C_5^+$ Gasoline | 89.1 | 88.8 | 88.8 | 88.0 | 88.4 | 87.6 | 88.6 | 88.0 |
| RON + O, $C_5^+$ Gasoline + Alkylate | 90.8 | 90.6 | 90.5 | 89.8 | 90.0 | 89.5 | 90.2 | 89.8 |

TABLE 6

Catalyst: FS-30 + 1% ZSM-5

| Run Number | 1 | 2 | 3 | 4 | 5 |
|---|---|---|---|---|---|
| Conversion, % Vol | 75.2 | 73.5 | 69.3 | 67.6 | 66.7 |
| $C_5^+$ Gasoline, % Vol | 50.4 | 53.0 | 54.2 | 52.6 | 53.8 |
| Total $C_4$, % Vol | 21.5 | 17.6 | 14.9 | 15.4 | 14.3 |
| Dry Gas, Wt % | 10.6 | 9.5 | 8.3 | 7.4 | 7.3 |
| Coke, Wt % | 6.58 | 6.34 | 3.89 | 4.04 | 3.19 |
| n-$C_4$, % Vol | 2.4 | 1.7 | 1.2 | 1.3 | 1.0 |
| i-$C_4$, % Vol | 10.5 | 8.9 | 6.6 | 7.1 | 6.4 |
| $C_4=$, % Vol | 8.7 | 7.1 | 7.1 | 7.1 | 6.9 |
| $C_3$, % Vol | 3.7 | 3.3 | 2.1 | 2.2 | 2.0 |
| $C_3=$, % Vol | 8.6 | 7.9 | 7.9 | 6.6 | 6.8 |
| $C_5^+$ Gasoline + Alkylate % Vol | 79.2 | 78.1 | 79.3 | 75.5 | 76.7 |
| Outside i-$C_4$, % Vol | 9.1 | 8.3 | 10.5 | 8.5 | 9.1 |
| RON + O, $C_5^+$ Gasoline | 91.0 | 0.0 | 89.3 | 89.2 | 88.9 |
| RON + O, $C_5^+$ Gasoline + Alkylate | 92.1 | 0.0 | 90.8 | 90.7 | 90.4 |

TABLE 7

| | Equilibrium FS-30 | +1% Partial Pressure Steamed ZSM-5 |
|---|---|---|
| Conversion, % Vol | 72.0 | 72.0 |
| $C_5^+$ Gasoline, % Vol | 53.5 | 53.8 |
| Total $C_5$'s, % Vol | 10.1 | 10.1 |
| Total $C_4$'s, % Vol | 17.8 | 16.5 |
| Dry Gas, Wt % | 8.2 | 9.0 |
| Coke, Wt % | 5.5 | 5.4 |
| n-$C_4$, % Vol | 1.7 | 1.5 |
| i-$C_4$, % Vol | 8.6 | 7.8 |
| $C_4=$, % Vol | 7.5 | 7.2 |
| $C_3$, % Vol | 2.7 | 2.8 |
| $C_3=$, % Vol | 6.9 | 8.1 |
| $C_5^+$ Gasoline + Alkylate, % Vol | 77.5 | 79.2 |
| Outside i-$C_4$, % Vol | 7.8 | 9.6 |
| RON + O, $C_5^+$ Gasoline | 88.6 | 90.1 |
| RON + O, $C_5^+$ Gasoline + Alkylate | 90.3 | 91.4 |

Example 5

This example illustrates the effect of long on-stream times and increased exposure to partial pressure steam of a catalyst selectivated in a cracking unit regenerator on the effect of octane number and gasoline yield of the product.

A sufficient quantity of the fresh 25% ZSM-5 additive catalyst prepared by the method of Example 3 was combined with equilibrium FS-30 to yield a 1% ZSM-5 catalyst composite. The composite was placed in a cyclic (integrated reactor-regenerator) cracking unit and operated at 970° F. (521° C.) riser top, 6–6.5 cat/oil, 2 second oil contact time while cracking Arab light gas oil (properties given below in Table 8). The regenerator conditions, where the ZSM-5 was exposed to partial pressure steam, were as follows:

| Temperature, °F. (°C.) | 1330 (721) |
|---|---|
| Pressure, psi | 45 |
| Steam, % | 5–15 |

Samples were withdrawn periodically from the cyclic unit and evaluated along with the conventional catalyst in the same fixed-fluidized bed unit under the conditions described in Example 3. The results are shown in Table 9.

TABLE 8

| Specific Gravity | .8774 |
|---|---|
| API° | 29.8 |
| Pour Point | 85° F. |
| Cloud Point | 120° F. |
| Viscosity KV at 100° C. | 5.341 |
| Sulfur | 0.76 wt % |
| ASTM Color | *L 1.0 |

*L = Less Than

TABLE 9

| Catalyst | Equil. FS-30 | +1% ZSM-5 | +1% ZSM-5 | +1% ZSM-5 | +1% ZSM-5 |
|---|---|---|---|---|---|
| Time On-Stream | 0 hrs | 6 hrs | 20 hrs | 35 hrs | 58 hrs |
| Conversion, % Vol | 68.0 | 67.3 | 67.1 | 67.5 | 67.9 |
| $C_5^+$ Gasoline, % Vol | 53.0 | 49.3 | 52.1 | 51.4 | 53.0 |
| Total $C_4$'s, % Vol | 15.2 | 17.8 | 15.1 | 16.1 | 15.3 |
| Dry Gas, % Vol | 7.5 | 7.8 | 7.4 | 7.5 | 7.3 |
| Coke, Wt % | 4.2 | 4.3 | 4.1 | 4.3 | 4.2 |
| Hydrogen Factor | 93 | 127 | 143 | 168 | 175 |
| i-$C_4$, % Vol | 7.2 | 7.8 | 6.2 | 6.6 | 6.7 |
| $C_4=$, % Vol | 6.8 | 8.7 | 7.5 | 8.2 | 7.5 |
| $C_3$, % Vol | 2.3 | 2.0 | 1.8 | 1.8 | 1.9 |
| $C_3=$, % Vol | 6.6 | 7.8 | 7.4 | 7.3 | 7.0 |
| $C_5^+$ Gasoline + Alkylate, % Vol | 75.4 | 77.0 | 77.0 | 77.2 | 77.1 |
| $C_5^+$ i-$C_4$, % Vol | 8.1 | 10.9 | 10.7 | 10.9 | 9.7 |
| RON + O, $C_5^+$ Gasoline | 88.1 | 90.6 | 91.0 | 90.4 | 90.1 |
| RON + O, $C_5^+$ Gasoline + Alkylate | 89.9 | 91.9 | 92.0 | 91.7 | 91.4 |

Example 6

In this example, the basic procedure of Example 5 was followed, with the exception that the cracking catalyst was admixed with ZSM-5 to yield a 2.5 wt % ZSM-5 composite catalyst. The cracking catalyst used for this Example, designated 75-F Equilibrium, is a commercial FCC cracking catalyst produced by the Harshaw-Filtrol Corp. and equilibrated in a commercial FCC unit. Catalyst 75-F compares to catalyst FS-30, described previously, in cracking function. The composite catalysts were contacted with JSHGO, charged to a cyclic cracking unit operating at 940° F. riser top temperature, 4–6 Cat/Oil ratio, and 2 second oil contact time. Regenerator conditions, where the ZSM-5 was exposed to partial pressure steam, were 1330° F. (720° C.), 45 psig and 5–15% steam. A sample was removed from the cyclic unit after 250 hours and evaluated along with the conventional cracking catalyst in the fixed fluidized bed unit under conditions described in Example 4. Detailed results are presented in Tables 10 and 11. Estimated results, corrected to constant conversion, are presented in Table 12.

TABLE 10

| Catalyst: 75-F Equilibrium | | | | | | |
|---|---|---|---|---|---|---|
| Run Numbers | 1 | 2 | 3 | 4 | 5 | 6 |
| Cat/Oil | 5.0 | 4.0 | 3.0 | 2.5 | 2.0 | 1.75 |
| Conversion, % Vol | 70.0 | 67.3 | 59.5 | 53.9 | 48.1 | 43.8 |
| $C_5^+$ Gasoline, % Vol | 54.8 | 54.5 | 50.4 | 46.7 | 42.4 | 39.1 |
| Total $C_4$, % Vol | 15.3 | 14.2 | 11.6 | 9.5 | 8.4 | 7.4 |
| Dry Gas, Wt % | 7.5 | 6.7 | 5.4 | 4.7 | 4.1 | 3.8 |
| Coke, Wt % | 4.8 | 3.7 | 2.8 | 2.6 | 2.1 | 1.9 |
| i-$C_4$, % Vol | 6.6 | 5.8 | 4.3 | 3.5 | 2.6 | 2.2 |
| $C_4=$, % Vol | 7.2 | 7.1 | 6.3 | 5.3 | 5.0 | 4.5 |
| $C_3=$, % Vol | 6.9 | 6.3 | 5.2 | 4.6 | 4.0 | 3.6 |
| $C_5^+$ Gasoline + Alkylate, % Vol | 78.5 | 76.8 | 69.6 | 63.3 | 57.5 | 52.6 |
| Outside i-$C_4$, % Vol | 9.5 | 9.3 | 8.7 | 7.7 | 7.5 | 6.9 |
| RON + O, $C_5^+$ Gasoline | 88.5 | 88.4 | 87.6 | 87.8 | 88.2 | 88.0 |
| RON + O, $C_5^+$ Gasoline + Alkylate | 90.2 | 90.1 | 89.4 | 89.4 | 89.8 | 89.6 |
| LFO, Wt % | 27.3 | 29.1 | 34.0 | 36.5 | 39.6 | 41.5 |
| HFO, Wt % | 5.0 | 5.8 | 8.2 | 10.7 | 13.2 | 15.1 |
| G + D, Wt % | 72.7 | 74.6 | 76.1 | 75.7 | 75.1 | 74.3 |

TABLE 11

| Catalyst: 2.5% ZSM-5 in Eq. 75-F (After 250 Hrs in Cyclic Unit) | | | | |
|---|---|---|---|---|
| Run Numbers | 1 | 2 | 3 | 4 |
| Cat/Oil | 5.0 | 4.0 | 3.0 | 2.5 |
| Conversion, % Vol | 63.1 | 56.7 | 49.5 | 47.7 |
| $C_5^+$ Gasoline, % Vol | 51.0 | 47.0 | 43.2 | 41.2 |
| Total $C_4$, % Vol | 13.0 | 11.0 | 8.7 | 9.1 |
| Dry Gas, Wt % | 6.5 | 5.6 | 4.4 | 4.2 |
| Coke, Wt % | 3.6 | 2.9 | 2.2 | 2.0 |
| i-$C_4$, % Vol | 4.6 | 3.4 | 2.5 | 2.3 |
| $C_4=$, % Vol | 7.4 | 6.7 | 5.5 | 6.2 |
| $C_3=$, % Vol | 6.3 | 5.4 | 4.2 | 3.9 |
| $C_3^+$ Gasoline + Alkylate, % Vol | 73.9 | 67.4 | 59.6 | 58.1 |
| Outside i-$C_4$, % Vol | 10.8 | 10.3 | 8.5 | 9.0 |
| RON + O, $C_5^+$ Gasoline | 89.4 | 89.0 | 90.5 | 88.6 |
| RON + O, $C_5^+$ Gasoline + Alkylate | 90.9 | 90.6 | 91.5 | 90.3 |
| LFO, Wt % | 32.8 | 36.1 | 39.1 | 40.9 |
| HFO, Wt % | 6.2 | 8.9 | 12.4 | 12.2 |
| G + D, Wt % | 75.2 | 75.3 | 75.3 | 75.6 |

TABLE 12

| Catalyst: | 75-F | +2.5% ZSM-5 | 75-F | +2.5% ZSM-5 |
|---|---|---|---|---|
| Time in Cyclic Unit, Hrs. | — | 250 | — | 250 |
| Conversion, % Vol | 50.0 | 50.0 | 60.0 | 60.0 |
| $C_5^+$ Gasoline, % Vol | 44.0 | 43.0 | 50.3 | 49.2 |
| Total $C_4$, % Vol | 8.7 | 9.2 | 11.6 | 11.9 |
| Dry Gas, Wt % | 4.3 | 4.6 | 5.5 | 6.1 |
| Coke, Wt % | 2.2 | 2.2 | 3.1 | 3.2 |
| i-$C_4$, % Vol | 2.9 | 2.6 | 4.4 | 4.0 |
| $C_4=$, % Vol | 5.1 | 6.0 | 6.2 | 7.0 |
| $C_3=$, % Vol | 4.1 | 4.3 | 5.3 | 5.9 |
| $C_5^+$ Gasoline + Alkylate, % Vol | 59.5 | 60.3 | 69.5 | 70.7 |
| Outside i-$C_4$, % Vol | 7.6 | 9.1 | 8.6 | 10.5 |
| RON + O, $C_5^+$ Gasoline | 88.0 | 89.4 | 88.1 | 89.3 |
| RON + O, $C_5^+$ Gasoline + Alkylate | 89.6 | 90.8 | 89.8 | 90.8 |
| LFO, Wt % | 38.7 | 39.3 | 33.5 | 34.3 |
| HFO, Wt % | 6.2 | 8.9 | 12.4 | 12.2 |
| G + D, Wt % | 75.6 | 75.4 | 75.6 | 75.2 |

Example 7

In this example, the procedure of Example 6 was followed with the exception that the composite catalyst was combined with ZSM-5 to yield a 3.5 wt % ZSM-5 composite catalyst. Samples were withdrawn periodically from the cyclic unit and evaluated in the same manner as Example 6. Estimated results, corrected to constant conversion, are presented in Tables 13 and 14.

TABLE 13

| Catalyst | 75-F | +3.5% ZSM-5 | | | | |
|---|---|---|---|---|---|---|
| Time in Cyclic Unit, Hrs | — | 4 | 144 | 328 | 496 | 600 |
| Conversion, % Vol | 50.0 | 50.0 | 50.0 | 50.0 | 50.0 | 50.0 |
| $C_5^+$ Gasoline, % Vol | 44.0 | 35.3 | 40.1 | 41.1 | 41.1 | 42.5 |
| Total $C_4$, % Vol | 8.7 | 14.5 | 10.6 | 10.2 | 9.0 | 9.0 |
| Dry Gas, Wt % | 4.3 | 7.5 | 5.4 | 5.1 | 5.1 | 4.7 |
| Coke, Wt % | 2.2 | 2.5 | 2.8 | 2.7 | 2.9 | 2.6 |
| i-$C_4$, % Vol | 2.9 | 3.9 | 3.0 | 3.0 | 2.6 | 2.6 |
| $C_4=$, % Vol | 5.1 | 9.8 | 6.9 | 6.6 | 5.7 | 5.8 |
| $C_3=$, % Vol | 4.1 | 9.5 | 5.7 | 5.4 | 4.9 | 4.5 |
| $C_5^+$ Gasoline + Alkylate, % Vol | 59.5 | 67.6 | 61.1 | 61.0 | 59.1 | 59.7 |
| Outside i-$C_4$, % Vol | 7.6 | 17.9 | 11.2 | 10.5 | 9.4 | 9.0 |
| RON + O, $C_5^+$ Gasoline | 88.0 | 9.3 | 90.4 | 90.6 | 90.1 | 90.0 |
| RON + O, $C_5^+$ Gasoline + Alkylate | 89.6 | 93.1 | 91.7 | 91.8 | 91.4 | 91.2 |
| LFO, Wt % | 38.7 | — | 40.1 | 39.0 | 40.1 | 39.4 |
| HFO, Wt % | 12.3 | — | 11.1 | 12.2 | 10.9 | 12.0 |
| G + D, Wt % | 75.6 | — | 74.0 | 73.3 | 75.1 | 74.8 |

TABLE 14

| Catalyst | 75-F | +3.5% ZSM-5 | | | | |
|---|---|---|---|---|---|---|
| Time in Cyclic Unit, Hrs | — | 4 | 144 | 328 | 496 | 600 |
| Conversion, % Vol | 60.0 | 60.0 | 60.0 | 60.0 | 60.0 | 60.0 |
| $C_5^+$ Gasoline, % Vol | 50.3 | 39.4 | 46.6 | 47.6 | 48.6 | 48.3 |
| Total $C_4$, % Vol | 11.6 | 18.5 | 13.4 | 13.3 | 11.8 | 11.8 |
| Dry Gas, Wt % | 5.5 | 10.2 | 7.0 | 6.4 | 6.2 | 6.0 |
| Coke, Wt % | 3.1 | 3.6 | 3.7 | 3.4 | 4.0 | 3.6 |
| i-$C_4$, % Vol | 4.4 | 6.5 | 4.6 | 4.4 | 3.8 | 3.8 |
| $C_4=$, % Vol | 6.2 | 10.8 | 7.8 | 8.0 | 7.1 | 7.0 |
| $C_3=$, % Vol | 5.3 | 12.4 | 7.3 | 7.0 | 6.0 | 5.8 |
| $C_5^+$ Gasoline + Alkylate, % Vol | 69.5 | 8.0 | 71.8 | 72.6 | 70.5 | 69.8 |
| Outside i-$C_4$, % Vol | 8.6 | 19.7 | 12.4 | 12.5 | 11.0 | 10.7 |
| RON + O, $C_5^+$ Gasoline | 88.1 | 92.3 | 90.4 | 90.7 | 90.7 | 90.1 |

TABLE 14-continued

| Catalyst | 75-F | +3.5% ZSM-5 | | | | |
|---|---|---|---|---|---|---|
| RON + O, $C_5^+$ Gasoline + Alkylate | 89.8 | 93.1 | 91.7 | 91.9 | 91.8 | 91.4 |
| LFO, Wt % | 33.5 | — | 33.4 | 33.3 | 33.5 | 34.1 |
| HFO, Wt % | 8.3 | — | 8.2 | 8.5 | 8.0 | 8.5 |
| G + D, Wt % | 75.6 | — | 72.4 | 72.9 | 74.1 | 74.1 |

Example 8

This example illustrates the effect of short oil-to-catalyst contact time on a selectivated catalyst composite. The selectivated catalyst of Example 5 and the conventional catalyst (FS-30—for comparison) were contacted with another chargestock (properties given in Table 15) in the following manner. The catalyst was heated to about 1300° F. (399° C.) and contacted with oil in a 3.5–4.0 cat/oil ratio. The catalyst and oil mixture passed through a reactor heated to 1000° F. (537° C.) while in contact for approximately 1 second. Detailed data from the runs are presented in Tables 16 and 17. Estimated results at constant conversion, based upon the data illustrated in Tables 16 and 17, are presented in Table 18.

TABLE 15

| Properties | |
|---|---|
| Gravity, API at 60° F. | 33.3 |
| Gravity, Specific at 60° F. | 0.8586 |
| Pour Point, °F. | 105 |
| KV at 40° C., Centistokes | 11.58 |
| KV at 100° C., Centistokes | 3.098 |
| Sulfur | 0.133 |
| Nitrogen, Total, ppm | 170 |
| Nitrogen, Basic, ppm | 85 |
| Hydrogen, Wt % | 13.62 |
| Aniline Point, °F. | 204.7 |
| Bromine Number | 2.9 |

TABLE 16

| Catalyst: Equilibrium FS-30 | | | | | | | | |
|---|---|---|---|---|---|---|---|---|
| Run Number | 1 | 2 | 3 | 4 | 5 | 6 | 7 | 8 |
| Conversion, % Vol. | 51.8 | 54.3 | 57.6 | 59.3 | 60.3 | 60.7 | 62.9 | 63.3 |
| $C_5^+$ Gasoline, % Vol | 41.6 | 43.1 | 45.6 | 46.7 | 46.4 | 47.4 | 49.8 | 50.5 |
| Total $C_4$, % Vol | 10.0 | 10.3 | 10.2 | 10.9 | 11.1 | 12.0 | 10.7 | 10.8 |
| Dry Gas, Wt % | 5.7 | 6.3 | 7.3 | 6.6 | 7.7 | 6.7 | 7.3 | 6.2 |
| Coke, Wt % | 2.03 | 2.18 | 2.39 | 2.48 | 2.57 | 2.52 | 3.18 | 3.23 |
| n-$C_4$, % Vol | 0.9 | 1.0 | 0.2 | 1.3 | 1.0 | 1.1 | 0.9 | 1.1 |
| i-$C_4$, % Vol | 2.4 | 2.3 | 3.7 | 2.5 | 2.3 | 3.0 | 2.8 | 2.5 |
| $C_4=$, % Vol | 6.7 | 7.0 | 6.3 | 7.1 | 7.8 | 7.9 | 7.1 | 7.2 |
| $C_3$, % Vol | 1.0 | 1.0 | 1.7 | 1.1 | 1.2 | 1.2 | 1.4 | 1.0 |
| $C_3=$, % Vol | 4.7 | 5.2 | 7.3 | 5.7 | 5.1 | 5.8 | 5.6 | 5.5 |
| $C_5^+$ Gasoline + Alkylate, % Vol | 60.7 | 63.4 | 66.7 | 68.1 | 69.6 | 70.2 | 71.0 | 71.8 |
| Outside i-$C_4$, % Vol | 10.5 | 11.4 | 10.7 | 11.8 | 13.3 | 12.3 | 11.5 | 11.8 |
| RON + O, Raw Gasoline | 89.0 | 0.0 | 0.0 | 88.5 | 88.5 | 88.5 | 0.0 | 89.2 |
| RON + O, $C_5^+$ Gasoline | 88.6 | 0.0 | 0.0 | 87.6 | 87.7 | 88.0 | 0.0 | 88.1 |
| RON + O, $C_5^+$ Gasoline + Alkylate | 90.4 | 0.0 | 0.0 | 89.7 | 89.9 | 90.1 | 0.0 | 89.0 |

TABLE 17

| Catalyst: Equilibrium FS-30 + 1 wt % ZSM-5 | | | | | | | | |
|---|---|---|---|---|---|---|---|---|
| Run Numbers | 1 | 2 | 3 | 4 | 5 | 6 | 7 | 8 |
| Conversion, % Vol | 42.6 | 52.2 | 57.9 | 60.6 | 61.2 | 62.9 | 63.7 | 67.5 |
| $C_5^+$ Gasoline, % Vol | 34.2 | 41.0 | 44.8 | 46.4 | 48.3 | 49.3 | 48.8 | 51.7 |
| Total $C_4$, % Vol | 8.3 | 9.2 | 11.2 | 10.7 | 13.0 | 12.3 | 12.1 | 13.6 |
| Dry Gas, Wt % | 1.40 | 3.09 | 2.53 | 2.57 | 3.01 | 3.19 | 2.97 | 4.05 |
| n-$C_4$, % Vol | 0.9 | 1.0 | 0.2 | 0.9 | 1.1 | 1.2 | 0.4 | 1.0 |
| i-$C_4$, % Vol | 1.7 | 2.1 | 4.2 | 3.0 | 3.3 | 3.0 | 4.2 | 3.4 |
| $C_4=$, % Vol | 5.7 | 6.0 | 6.8 | 6.7 | 8.7 | 8.1 | 7.6 | 9.2 |
| $C_3$, % Vol | 0.8 | 0.9 | 2.1 | 1.5 | 1.0 | 1.1 | 1.9 | 1.4 |
| $C_3=$, % Vol | 4.1 | 4.2 | 5.8 | 6.3 | 4.8 | 5.7 | 6.9 | 6.0 |

TABLE 17-continued

| Catalyst: Equilibrium FS-30 + 1 wt % ZSM-5 | | | | | | | | |
|---|---|---|---|---|---|---|---|---|
| Run Numbers | 1 | 2 | 3 | 4 | 5 | 6 | 7 | 8 |
| $C_5^+$ Gasoline + Alkylate, % Vol | 50.6 | 58.2 | 65.9 | 68.2 | 70.9 | 72.5 | 73.0 | 77.1 |
| Outside i-$C_4$, % Vol | 9.3 | 9.4 | 10.1 | 11.7 | 11.8 | 12.6 | 12.2 | 13.6 |
| RON + O, Raw Gasoline | 88.8 | 88.9 | 91.1 | 0.0 | 0.0 | 89.4 | 91.1 | 89.7 |
| RON + O, $C_5^+$ Gasoline | 88.2 | 88.2 | 91.2 | 0.0 | 0.0 | 88.5 | 91.3 | 89.4 |
| RON + O, $C_5^+$ Gasoline + Alkylate | 90.2 | 90.1 | 92.2 | 0.0 | 0.0 | 90.4 | 92.2 | 91.1 |

TABLE 18

| Catalyst | FS-30 | FS-30 +1% ZSM-5 | FS-30 | FS-30 +1% ZSM-5 |
|---|---|---|---|---|
| Conversion, % Vol | 55.0 | 55.0 | 60.0 | 60.0 |
| $C_5^+$ Gasoline, % Vol | 43.4 | 42.9 | 47.0 | 46.6 |
| Total $C_4$'s, % Vol | 10.5 | 10.2 | 11.0 | 11.4 |
| Dry Gas, Wt % | 6.6 | 6.2 | 7.1 | 6.7 |
| Coke, Wt % | 2.1 | 2.5 | 2.6 | 2.9 |
| n-$C_4$, % Vol | 0.8 | 0.7 | 0.9 | 0.8 |
| i-$C_4$, % Vol | 2.7 | 3.0 | 2.9 | 3.3 |
| $C_4=$, % Vol | 6.9 | 6.4 | 7.2 | 7.3 |
| $C_3$, % Vol | 1.2 | 1.4 | 1.3 | 1.5 |
| $C_3=$, % Vol | 5.6 | 5.1 | 5.9 | 5.6 |
| $C_5^+$ Gasoline + Alkylate, % Vol | 64.3 | 62.4 | 69.1 | 68.2 |
| Outside i-$C_4$, % Vol | 11.3 | 10.0 | 12.0 | 11.2 |
| RON + O, $C_5^+$ Gasoline | 87.9 | 89.7 | 87.7 | 89.9 |
| RON + O, $C_5^+$ Gasoline + Alkylate | 90.0 | 91.1 | 89.9 | 91.3 |
| Mix Temperature, °F. | 1035 | 1057 | 1071 | 1079 |

Discussion of Examples 3-8

Example 3 compares runs conducted with a conventional cracking catalyst to runs in which the ZSM-5 type zeolite component was treated at 1450° F. and 1350° F. with partial pressure steam and combined with the conventional cracking catalyst to give 1 and 2% ZSM-5 composite catalysts. The efficiency of octane gain, as measured by $C_5^+$ gasoline yield/RON+O, was calculated by adjusting yields with the ZSM-5 additive-containing catalyst to the conversion obtained with the conventional cracking catalyst, using a 0.7 incremental gasoline efficiency ($C_5^+$ gasoline yield/conversion). No attempt was made to adjust octane, since its sensitivity to the small changes in conversion involved is slight. Referring to the first chart in Table 4, the 1450° F. partial pressure steamings of the ZSM-5 type additive show the improved yield-octane performance. The catalyst composites which contain the ZSM-5 additive steamed 10 hours at 1450° F., 0 psig, 45% steam increased octane by 1 RON+O with essentially no loss in yield. The 5 hour steamed ZSM-5 additive is not selectivated as much as the 10 hour one as evidenced by the larger yield losses associated with the octane gains.

The ZSM-5 additive was also steam treated at 1350° F. (lower chart of Table 4) with partial pressure steam and combined in the same manner as before with the conventional cracked catalyst. When the ZSM-5 additive was steamed under these less severe conditions, cracking performance was more nearly similar to that achieved with a fresh catalyst, i.e., a $C_5^+$ gasoline yield/RON+O value of about −2.0. There is some indication from the 1% ZSM-5 composites at the 10 and 15 hour steaming times that longer steaming at these conditions may result in improved gasoline yield/octane performance, perhaps approaching that achieved with the 1450° F. partial pressure steamings.

Figure 2:
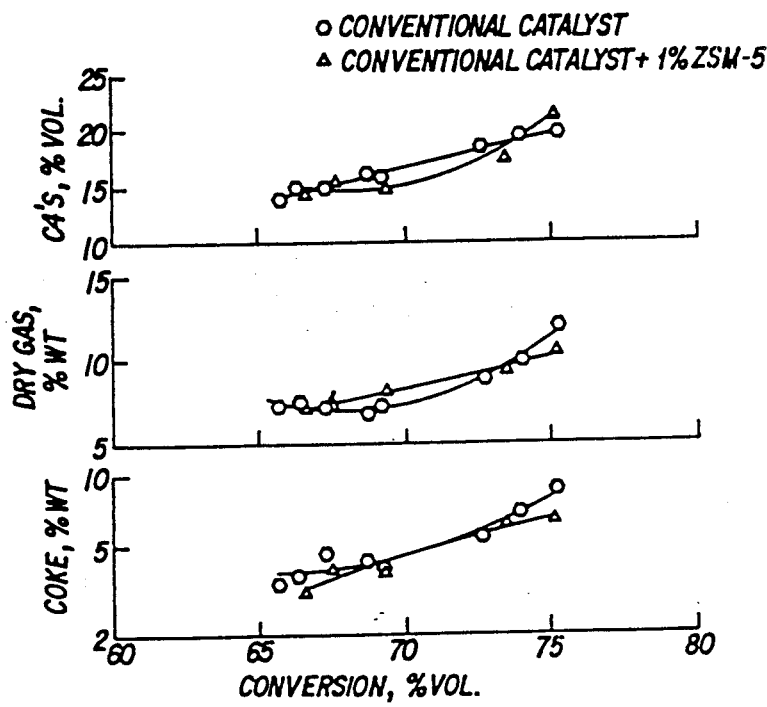
FIG. 2 is a graph illustrating the effect of a ZSM-5 catalyst in admixture with a conventional FCC catalyst with regard to coke, dry gas and $C_4$ hydrocarbon yield.
Figure 3:
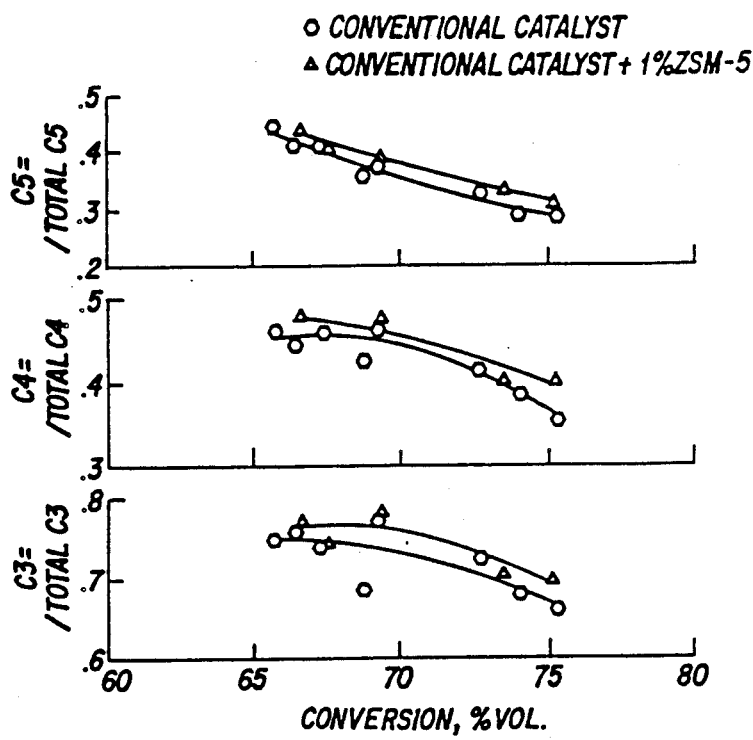
FIG. 3 is a graph illustrating the effect of a ZSM-5 catalyst in admixture with a conventional FCC catalyst with regard to $C_3$ olefin/total $C_3$, $C_4$ olefin/total $C_4$, and $C_5$ olefin/total $C_5$ yield.

The gasoline octane-selectivity plot in FIG. 1, which was determined from the data in Tables 5 and 6, and the estimated yields at constant conversion as illustrated in Table 7 show that the ZSM-5 composite has equivalent selectivity and higher octane over a wide conversion range, compared to the conventional cracking catalyst. Compared to the conventional cracking catalyst, the ZSM-5 composite improves octane by 1-2 RON+O over the conversion range studied, with the higher advantage occurring at high conversion (high cat/oil) in the overcracking region. At peak gasoline yields, the advantage is about 1.5 RON+O. Coke selectivity, as illustrated in FIG. 2, of the ZSM-5 catalyst is about equivalent to that of the conventional cracking catalyst. The ZSM-5 catalyst also shows a propensity to produce more dry gas, particularly propylene, and less $C_4$'s than the conventional cracking catalyst. As illustrated in FIG. 3, ZSM-5 has a tendency to produce a higher fraction of light olefins, compared to saturates of the same carbon number. This suggests that the ZSM-5 composite catalyst may alkylate or aromatize these olefins, thereby maintaining the gasoline yield and improving octane. Because ZSM-5 produced more propylene and less isobutane in Example 4, it allows for 1.5-2.0% volume higher potential alkylate yield, but requires 1.5-2.0% volume more outside isobutane to accomplish the alkylation. Thus, Example 4 illustrates that the use of a selectivated ZSM-5 FCC additive can improve the gasoline octane number by about 1.5 RON+O without sacrificing yield.

Referring now to Example 5, it can be seen from Table 9 that, after 6 hours cracking time on stream, ZSM-5 shows a gasoline octane increase of 2.5 RON+O at the expense of a 3.2% volume loss in $C_5^+$ gasoline yield, after adjusting for conversion. Gas make, particularly $C_3$ and $C_4$ olefins and i-$C_4$, increased while coke make remains essentially constant. As the ZSM-5 catalyst became more selectivated, the yield patterns changed and improved. The ZSM-5 catalyst was selectivated by exposure to partial pressure steam at elevated temperatures in the regenerator. As time on stream increased, the gasoline yield of the ZSM-5 containing catalyst increased and the gas make decreased while maintaining a 2-3 gasoline RON-O advantage, as compared to the conventional cracking catalyst. At the conclusion of the testing, i.e., at 58 hours, the ZSM-5 containing catalyst had virtually the same gasoline and gas make in the fixed fluidized bed testing as the base catalyst and provided a 2.0 gasoline RON+O improvement. There was a shift in the gas make with ZSM-5 toward the production of the $C_3$ and $C_4$ olefins, with a corresponding decrease in the yield of saturates of the same number. While not wishing to be restricted to any one theory, it is believed that the greater light olefin fraction indicates that the gasoline with the ZSM-5 containing catalyst is more olefinic or that the ZSM-5 can act on the higher light olefin concentration to produce a higher octane gasoline by alkylation or aromatization.

Additional studies were conducted at the 2.5 (Example 6) and 3.5 (Example 7) wt % level of ZSM-5. The estimated results for the 2.5 wt % ZSM-5, as illustrated in Table 12, show octane increased 1-1.5 RON+O and gasoline plus distillate (G+D) wt % yields were essentially the same, as compared to the conventional cracking catalyst.

As illustrated in Tables 13 and 14, the estimated results for 3.5 wt % ZSM-5, corrected to constant conversion, show initially (4 hours on stream) that ZSM-5 raised octane by 4.2 RON+O, but decreased $C_5^+$ gasoline yield by 10% volume. However, at long on-stream times and increased exposure to partial pressure steam, octane increased 2 RON+O and G+D loss declined to essentially zero.

Figure 4:
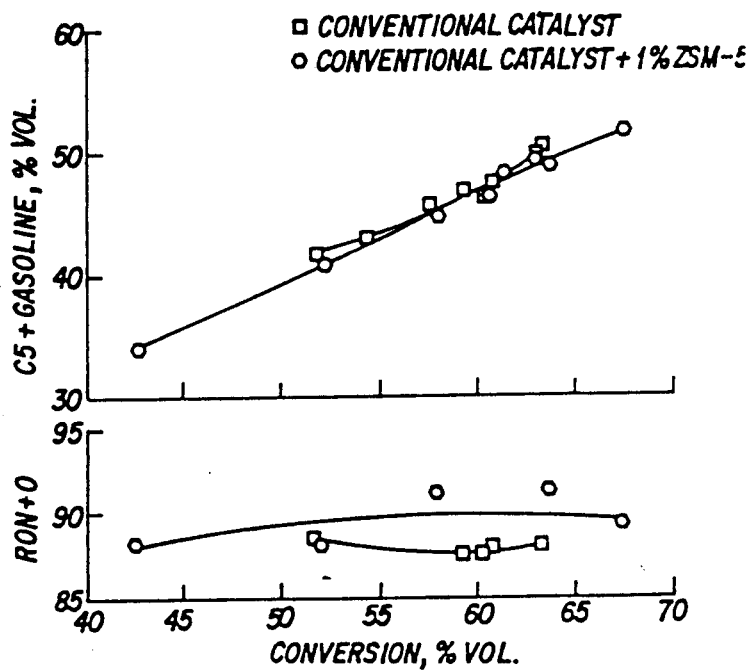
FIG. 4 is a graph illustrating the effect of ZSM-5 catalyst in admixture with a conventional FCC catalyst with regard to $C_5^+$ gasoline yield and RON+O for a feedstock different than that used with respect to FIG. 1.

With reference now to Example 8, and particularly Table 18, it can be seen that the conventional cracking catalyst with 1 wt % ZSM-5 exhibits a 2.0 RON+O advantage over the conventional cracking catalyst alone, with only a slight loss in gasoline yield in a short contact time fluid transport unit. From the estimates shown in Table 18, and the gasoline selectivity-octane plot of FIG. 4 (data accumulated from Tables 16 and 17), the 2.0 RON+O advantage is apparent with a drop in gasoline selectivity of 0.4% volume over a wide range of conversions near the distillate operating mode. The mix temperature is slightly higher for the ZSM-5-conventional cracking catalyst composite, indicating a slightly lower activity, but the difference is not large enough to be responsible for octane gain. Thus, the octane gain with only a slight yield loss for the selectivated conventional cracking catalyst/ZSM-5 composite was significant in a short contact time fluid transport unit.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A method of adding ZSM-5 catalyst to a fluid catlytic cracking (FCC) unit containing an inventory of equilibrium catalyst comprising:
   (a) adding ZSM-5 catalyst to said equilibrium catalyst inventory, wherein the wt % ZSM-5, on a pure ZSM-5 basis, added to the catalyst inventory is equal to 1 to 6 wt % of the equilibrium catalyst and sufficient to increase the research octane number of the FCC gasoline product from 0.5 to 3.0 octane numbers, and wherein said ZSM-5 enhancement effect is attained within a 24-hour period;
   (b) adding thereafter, on a daily basis for at least a one-week period, additional ZSM-5 catalyst in gradually reducing increments catalyst sufficient to maintain the desired increase in product octane number, whereby an FCC gasoline fraction with increased product octane is produced as a product of the process.

2. The method of claim 1, wherein the octane boost is 1.0-1.5.

3. The method of claim 1, wherein ZSM-5 is added on a daily basis for at least 30 days.

4. A method of incorporating ZSM-5 catalyst into a fluid catalytic cracking (FCC) unit containing equilibrium FCC catalyst comprising rare earth Y zeolite in a matrix comprising:
   (a) adding within a 24-48 hour period ZSM-5 zeolite in the form of 25 wt % zeolite and 75 wt % binder, in an amount equivalent to 2-5 wt % of the equilibrium catalyst, based on the weight of ZSM-5 zeolite, and binder, and on the total weight of equilibrium catalyst circulating within the FCC unit, and sufficient to increase the octane number of the FCC gasoline product by about 1.0 to 1.5 research octane numbers;
   (b) adding, on a daily basis thereafter, for at least one week a diminishing amount of ZSM-5 catalyst to maintain the increase in octane number of the FCC gasoline product.

* * * * *